United States Patent
Colligan

(10) Patent No.: US 6,568,582 B2
(45) Date of Patent: May 27, 2003

(54) APPLICATION OF FRICTION STIR WELDING TO SUPERPLASTICALLY FORMED STRUCTURAL ASSEMBLIES

(75) Inventor: Kevin James Colligan, Harvest, AL (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/301,458

(22) Filed: Nov. 21, 2002

(65) Prior Publication Data

US 2003/0071107 A1 Apr. 17, 2003

Related U.S. Application Data

(62) Division of application No. 09/818,325, filed on Mar. 27, 2001.

(51) Int. Cl.⁷ .................. B23K 20/12; B23K 20/02; B23K 20/18; B21D 26/02
(52) U.S. Cl. ............... 228/112.1; 228/114; 228/181; 228/190; 228/203; 228/211
(58) Field of Search .................. 428/593, 598, 428/629, 654, 660, 615, 594, 472.1, 472.2, 636; 228/118, 181, 190, 211, 203, 112.1, 113, 114; 29/897.32, 897; 205/322, 124

(56) References Cited

U.S. PATENT DOCUMENTS

| 4,351,470 A | * | 9/1982 | Swadling et al. ............ 228/157 |
| 5,204,161 A | | 4/1993 | Pettit et al. |
| 5,224,645 A | * | 7/1993 | Cooper et al. ............... 228/157 |
| 5,687,900 A | | 11/1997 | Zaccone et al. |
| 5,797,239 A | | 8/1998 | Zaccone et al. |
| 5,881,459 A | | 3/1999 | Yasui |
| 5,994,666 A | * | 11/1999 | Buldhaupt et al. ...... 219/121.64 |
| 6,053,391 A | * | 4/2000 | Heideman et al. ............ 228/2.1 |
| 6,138,898 A | * | 10/2000 | Will et al. .................... 228/157 |
| 6,337,471 B1 | * | 1/2002 | Kistner et al. ............... 219/633 |
| 6,378,264 B1 | * | 4/2002 | Kawasaki et al. ............. 52/633 |

FOREIGN PATENT DOCUMENTS

| EP | 0 972 605 A2 | 1/2000 |
| EP | 1 057 574 A2 | 12/2000 |
| WO | WO 01/17721 A1 | 3/2001 |

OTHER PUBLICATIONS

European Search Report, EP 02 07 6168, Examiner R. Cuiper, dated Jul. 19, 2002.

* cited by examiner

Primary Examiner—John J. Zimmerman
(74) Attorney, Agent, or Firm—Alston & Bird LLP

(57) ABSTRACT

The superplastically formed structural assembly includes first and second structural members having facing surfaces. The first and second structural members can include a first outer structural member, a second outer structural member or at least one intermediate structural member. In one embodiment, the first and second structural members include first and second outer structural members. In another embodiment, the first and second structural members include first and second intermediate structural members. The structural assembly includes at least one friction stir weld joint joining the first and second structural members. In one embodiment, the facing surface of the first structural member is at least partially covered with oxide to prevent thermo-compression welding of the first and second structural members adjacent the at least one friction stir weld joint. In another embodiment, the facing surface of the second structural member is at least partially covered with oxide.

35 Claims, 16 Drawing Sheets

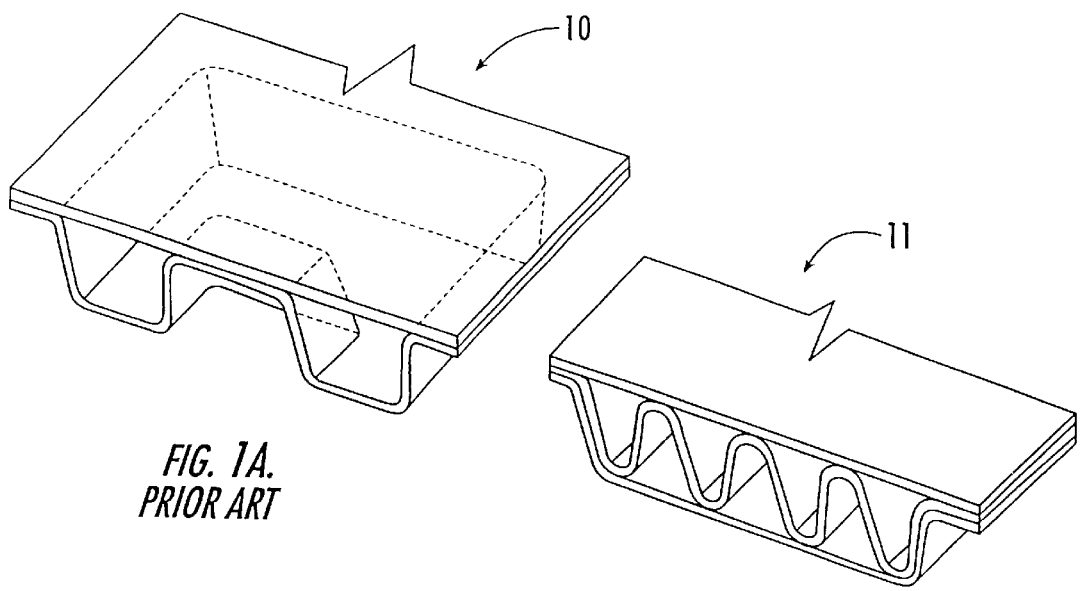
FIG. 1A.
PRIOR ART
FIG. 1B.
PRIOR ART
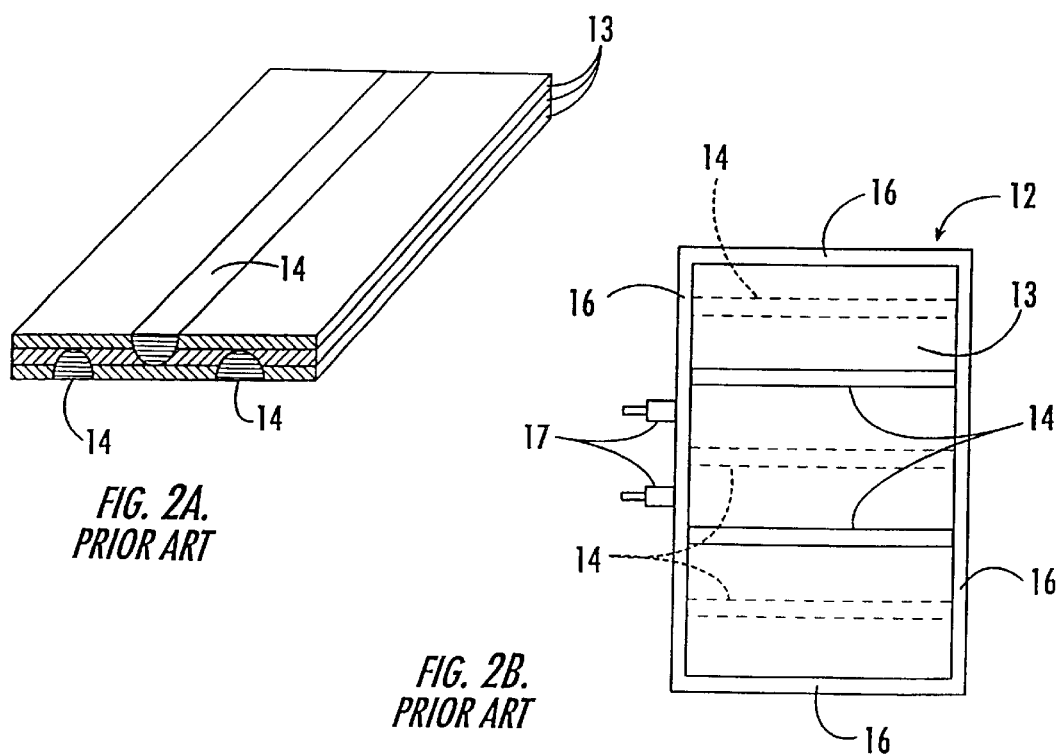
FIG. 2A.
PRIOR ART
FIG. 2B.
PRIOR ART

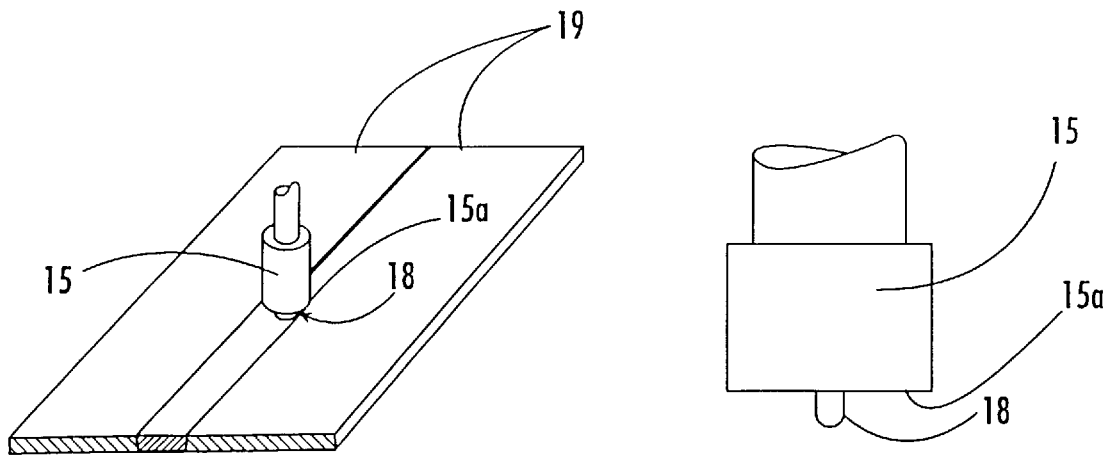
FIG. 3.
PRIOR ART
FIG. 3A.
PRIOR ART
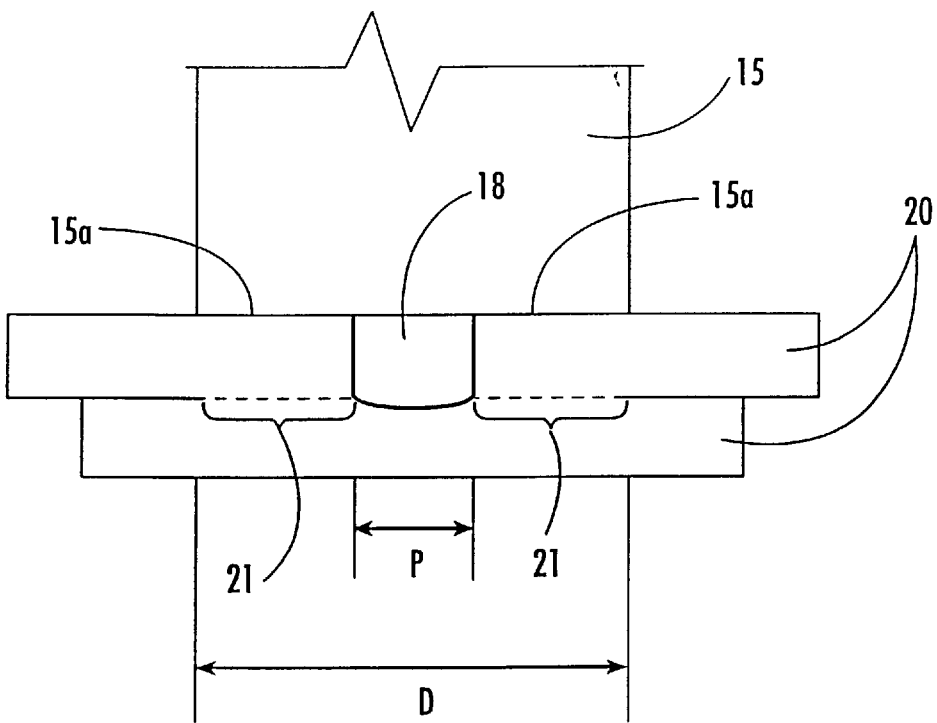
FIG. 4.
PRIOR ART

APPLICATION OF FRICTION STIR WELDING TO SUPERPLASTICALLY FORMED STRUCTURAL ASSEMBLIES

CROSS REFERENCE TO RELATED APPLICATIONS

This application is a divisional of U.S. patent application Ser. No. 09/818,325, filed Mar. 27, 2001, which application is hereby incorporated by reference in its entirety.

FIELD OF THE INVENTION

The present invention relates to structural assemblies and, more particularly, relates to the application of friction stir welding to superplastically formed structural assemblies.

BACKGROUND OF THE INVENTION

Superplastic forming ("SPF") is a process used to form structural assemblies having complex three-dimensional shapes, such as the two- and three-sheet assemblies 10, 11 illustrated in FIGS. 1A and 1B, respectively. These assemblies are formed from metal alloys, such as aluminum and titanium alloys (particularly Zn-22A1 and Ti-6A1-4V) that exhibit superplastic behavior at certain temperatures, i.e., large elongation (up to 2000 percent) under low strain rates. During the SPF process, a multi-sheet SPF pack is placed into a shaping die and heated to a sufficiently high temperature to soften the sheets of material. Pressurized heated gas is then injected into the SPF pack, causing the pack to inflate and fill the die. The assembly is then cooled and removed from the die and final machining steps are performed, such as edge trimming, to form the finished structural assembly.

As illustrated in FIG. 2A, the SPF pack 12 used to form the structural assembly is constructed by stacking two or more sheets 13 of material (a three-sheet SPF pack is illustrated in FIG. 2) and joining the sheets by forming partial-penetration weld joints 14 making a pre-selected pattern using any conventional fusion welding processes such as oxyfuel, arc, and resistance welding. A partial-penetration weld joint joins two or more adjacent sheets in a stack, but generally does not join all the sheets in the stack. The partial-penetration weld joints define areas therebetween where the adjacent sheets 13 remain in contact after the SPF pack 12 has been inflated to form the structural assembly. As illustrated in FIG. 2B, prior to inflating the SPF pack 12, the sheets of material 13 in the stack are joined by full-penetration weld joints 16 along the periphery of the stack to thereby form a sealed pack 12. Plumbing fittings 17 are connected to the interior of the pack 12 through gas passages (not shown) machined into or between the sheets of material so that pressurized heated gas can be injected into the pack. The SPF pack 12 is typically sealed around the plumbing fittings 17 by fillet welds formed between the fittings 17 and the edge of the pack 12 using conventional fusion welding processes.

The SPF process is particularly advantageous since complex shapes can be formed with lower tooling costs. Additionally, structural assemblies formed using the SPF process have minimal residual stresses. Notwithstanding these benefits, the materials used during the SPF process are generally limited to those that are readily weldable using conventional fusion welding techniques, such as oxyfuel, arc, and resistance welding, due to the necessity of forming partial-penetration and full-penetration welds in preparing the SPF packs. Thus, "unweldable" materials are unavailable to designers for use with the SPF process, as these materials produce relatively weak weld joints. "Unweldable" materials are materials that possess high conductivity and quickly dissipate heat away from the weld joint and/or that exhibit cracking along the weld joint as a result of stresses caused by thermal expansion. Such materials include aluminum and some aluminum alloys, particularly some AA 2000 and 7000 series alloys. The exclusion of these materials from use with the SPF process has been problematic, as many of these materials possess special corrosion, fatigue, strength, density or ductility characteristics that are desired in certain applications.

In seeking better methods for forming SPF packs and, in particular, forming the partial-penetration and full-penetration welds between the individual sheets in the pack, a relatively new welding process known as friction stir welding has been proposed. As illustrated in FIGS. 3 and 3A, friction stir welding is a solid state process in which the probe 18 of a rotating friction stir welding tool 15, which is attached to a friction stir welding machine (not shown), is forced into or between workpieces 19 that are to be joined. The frictional heat generated by the rotating probe 18 and the shoulder 15a of the friction stir welding tool 15 creates a plasticized region or joint between the workpieces 19 that subsequently solidifies thereby joining the workpieces. See U.S. Pat. No. 5,460,317 to Thomas et al. for a general discussion of friction stir welding, the contents of which are incorporated herein by reference.

Although friction stir welding is a solid state process that can be used to join materials that were previously considered unweldable using conventional fusion welding techniques, the use of friction stir welding to form weld joints between stacked sheets of material during the construction of SPF packs presents several problems. First, as illustrated in FIG. 4, the frictional heat conducted to the interface between the sheets 20 by the rotating friction stir welding probe 18 and the tool shoulder 15a, when combined with the pressure exerted on the sheets by the shoulder, can cause thermo-compression welding 21 of the interface between the adjacent sheets resulting in weld joints as wide as the diameter D of the shoulder. In this regard, the diameter D can vary, depending on the thickness of the material being welding, from approximately 0.2 inches to approximately 1 inch, and even as much as approximately 1.6 inches for relatively thick sheets. Thermo-compression welding 21 is particularly a problem when friction stir welding thin sheets of material, on the order of 1.5 mm in thickness. Ideally, in order to maintain the tolerances of the finished structural assembly and minimize stock material usage, the weld joints should only be as wide as the diameter P of the friction stir welding probe 18, which typically is about as large as the thickness of the plate or plates to be welded. For example, for a 1.5 mm plate, a 1.5 mm diameter probe would be acceptable. Secondly, as illustrated in FIG. 2B, to contain the pressurized heated gas that is injected into the SPF pack 12 during the SPF process, the pack is sealed by forming full-penetration weld joints 16 around the periphery of the pack. However, on the side of the SPF pack 12 where the plumbing fittings 17 are attached, friction stir welding cannot be used as the rotating probe 18 will impinge upon and damage the plumbing fittings and/or obstruct the internal passages intended for delivery of gas to the interior portion of the SPF pack.

Thus, there is a need for improved methods of forming SPF packs, and particularly, for friction stir welding SPF packs. Such manufacturing methods should be cost effective, minimize thermo-compression welding of the interface between adjacent sheets of material and prevent damage to the plumbing fittings of SPF packs.

SUMMARY OF THE INVENTION

The present invention provides a superplastically formed structural assembly and an associated method for manufacturing. The structural assembly includes first and second structural members having facing surfaces. The first and second structural members can include a first outer structural member, a second outer structural member or one or more intermediate structural members. In one embodiment, the first and second structural members include first and second outer structural members. In another embodiment, the first and second structural members include first and second intermediate structural members. The first and second structural members may be formed of titanium, aluminum, or alloys thereof. In one embodiment, the first and second structural members are formed of dissimilar metals.

The structural assembly includes at least one friction stir weld joint joining the first and second structural members. The structural assembly may include a plurality of friction stir weld joints joining the first and second structural members. In one embodiment, the plurality of friction stir weld joints define areas therebetween wherein the facing surface of the first structural member is spaced apart from the facing surface of the second structural member. In another embodiment, the facing surface of the first structural member is at least partially covered with oxide. In yet another embodiment, the facing surface of the second structural member is at least partially covered with oxide. In still another embodiment, the oxide has a thickness of at least 5 nm. Advantageously, the oxide prevents thermo-compression welding of the first and second structural members adjacent the at least one friction stir weld joint.

The present invention also provides a method for manufacturing a structural assembly. In one embodiment, the method includes the steps of providing first and second structural members. Advantageously, a surface of at least one of the first and second structural members is selectively anodized to thereby prevent thermo-compression welding between the first and second structural members. In one embodiment, the selective anodizing step includes immersing the at least one of the first and second structural members in an anodize bath as the anode in an electrolytic cell. In another embodiment, the selective anodizing step includes brush anodizing the surface of the at least one of the first and second structural members. The first and second structural members are stacked and then selectively joined to form a sealed forming pack. The sealed forming pack is then superplastically formed to thereby form the structural assembly. The structural assembly may be machined after the superplastic-forming step.

In one embodiment, the superplastic-forming step includes positioning the sealed forming pack in a shaping die. The sealed forming pack is then heated according to a predetermined temperature schedule. Following the heating step, pressurized heated gas is injected into the sealed forming pack to inflate the sealed forming pack into a shape defined by the shaping die.

In another embodiment, the method of manufacturing includes the steps of selectively anodizing a surface of at least one structural member, which structural member can include a first outer structural member, a second outer structural member, or an intermediate structural member, to thereby prevent thermo-compression welding to the at least one structural member having the selectively anodized surface. In one embodiment, the selective anodizing step includes immersing the at least one structural member in an anodize bath as the anode in an electrolytic cell. In another embodiment, the selective anodizing step includes brush anodizing the surface of the at least one structural member. The first and second outer structural members and at least one intermediate structural member are then stacked such that the at least one intermediate structural member is positioned between the first and second outer structural members. The first and second outer structural members are then selectively joined to the at least one intermediate structural member to form a sealed forming pack. In one embodiment, the selective joining step occurs concurrently with the stacking step. The sealed forming pack is then superplastically formed to thereby form a structural assembly. The structural assembly may be machined after the superplastic-forming step.

In yet another embodiment, the method of manufacturing a structural assembly includes the steps of joining strips of fusion weldable material to corresponding first edges of first and second structural members. The first and second structural members are then stacked such that the strips of fusion weldable material attached to the corresponding first edges of the first and second structural members are superimposed. In one embodiment, at least one partial-penetration friction stir weld joint is formed between the first and second structural members after the stacking step. Prior to the partial-penetration-weld-joint-forming step, the surface of at least one of the first and second structural members may be selectively anodized. In one embodiment, the selective anodizing step includes immersing the at least one of the first and second structural members in an anodize bath as the anode in an electrolytic cell. In another embodiment, the selective anodizing step includes brush anodizing the surface of the at least one of the first and second structural members. After the stacking step, full-penetration friction stir weld joints are formed along a portion of the peripheral edges of the first and second structural members and the strips of fusion weldable material to thereby define a non-welded plumbing edge along the strips of fusion weldable material. Plumbing fittings are at least partially inserted into the plumbing edge of the strips of fusion weldable material. In one embodiment, prior to the stacking step, cutouts to receive the plumbing fittings can be machined in the plumbing edge of at least one of the strips of fusion weldable material. After the inserting step, a fusion weld joint is formed along at least a portion of the plumbing edge of the strips of fusion weldable material such that the plumbing fittings are sealed between the strips of fusion weldable material. The first and second structural members are then superplastically formed to thereby form the structural assembly. The strips of fusion weldable material attached to the corresponding first edges of the first and second structural members can be machined away after the superplastic-forming step.

The method of manufacture according to the previous embodiment may also include joining a strip of fusion weldable material to a corresponding first edge of at least one intermediate structural member. The first and second outer structural members and the at least one intermediate structural member are then stacked such that the at least one intermediate structural member is positioned between the first and second outer structural members and the corresponding strips of fusion weldable material are superimposed. In one embodiment, the surface of at least one structural member, which structural member may include the first outer structural member, the second outer structural member, or an intermediate structural member, may be selectively anodized prior to the stacking step. In one embodiment, the selective anodizing step includes immersing the at least one structural member in an anodize bath as the anode in an electrolytic cell. In another embodiment, the selective anodizing step comprises brush anodizing the surface of the at least one structural member. At least one partial-penetration friction stir weld joint may then be formed between the at least one structural member having a selectively anodized surface and an adjacent structural member concurrently with the stacking step. After the stacking step, full-penetration friction stir weld joints are formed along a portion of the peripheral edges of the first and second outer structural members, the at least one intermediate structural member, and the strips of fusion weldable material to thereby define a non-welded plumbing edge along the strips of fusion weldable material. Plumbing fittings are then at least partially inserted into the plumbing edge of at least one of the strips of fusion weldable material. In one embodiment, prior to the stacking step, cutouts to receive the plumbing fittings can be machined in the plumbing edge of at least one of the strips of fusion weldable material. After the inserting step, a fusion weld joint is formed along at least a portion of the plumbing edge of the strips of fusion weldable material such that the plumbing fittings are sealed between the strips of fusion weldable material. The first and second outer structural members and the at least one intermediate structural member are then superplastically formed to thereby form the structural assembly. The strips of fusion weldable material friction stir welded to the corresponding first edges of the first and second outer structural members and the at least one intermediate structural member may be machined away after the superplastic-forming step.

In yet another embodiment, the method of manufacturing a structural assembly includes the steps of drilling at least one aperture into a peripheral edge of at least one of a plurality of structural members, wherein the at least one aperture defines a primary gas passage. The plurality of structural members are stacked. After the stacking step, full penetration friction stir weld joints are formed along peripheral edges of the plurality of structural members other than a non-welded plumbing edge, wherein the plumbing edge comprises the primary gas passage. An edge member is secured to the plumbing edge of the plurality of structural members. The plumbing edge may be machined flush prior to the securing step. At least one aperture is drilled through the edge member to thereby define a secondary gas passage such that the secondary gas passage of the edge member is in fluid communication with the primary gas passage of the plumbing edge. A plumbing fitting is attached to the secondary gas passage of the edge member. The plurality of structural members are then superplastically formed to thereby form the structural assembly. The edge member may be machined away after the superplastic-forming step. In one embodiment, the surface of at least one of the plurality of structural members is selectively anodized prior to the stacking step. In one embodiment, the selective anodizing step includes immersing the at least one of the plurality of structural members in an anodize bath as the anode in an electrolytic cell. In another embodiment, the selective anodizing step comprises brush anodizing the surface of the at least one of the plurality of structural members. In another embodiment, at least one partial-penetration friction stir weld joint may be formed between the at least one structural member having a selectively anodized surface and an adjacent structural member after the selective anodizing step.

Accordingly, there has been provided a structural assembly and an associated method of manufacture allowing for the cost-effective manufacture of superplastically-formed structural assemblies using friction stir welding to form the SPF packs. The method of manufacture minimizes thermo-compression welding of the interface between adjacent sheets of material and prevents damage to the plumbing fittings of SPF packs. The resultant structural assemblies have fine details, close tolerances, and minimal residual stresses.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 1A is a fragmentary perspective view illustrating a two-sheet superplastically formed structural assembly, as is known in the art;

FIG. 1B is a fragmentary perspective view illustrating a two-sheet superplastically formed structural assembly, as is known in the art;

FIG. 2A is a perspective view illustrating partial-penetration welds formed in a stack of sheet material using conventional fusion welding techniques, as is known in the art;

FIG. 2B is a plan view illustrating a conventional SPF pack prior to undergoing superplastic forming that is known in the art.

FIG. 3 is a perspective view illustrating the joining of two workpieces through a friction stir weld butt joint, as is known in the art;

FIG. 3A is a plan view illustrating a conventional friction stir welding tool, as is known in the art;

FIG. 4 is a partial cross-sectional view illustrating a thermo-compression weld formed when friction stir welding two stacked sheets of material;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 5:
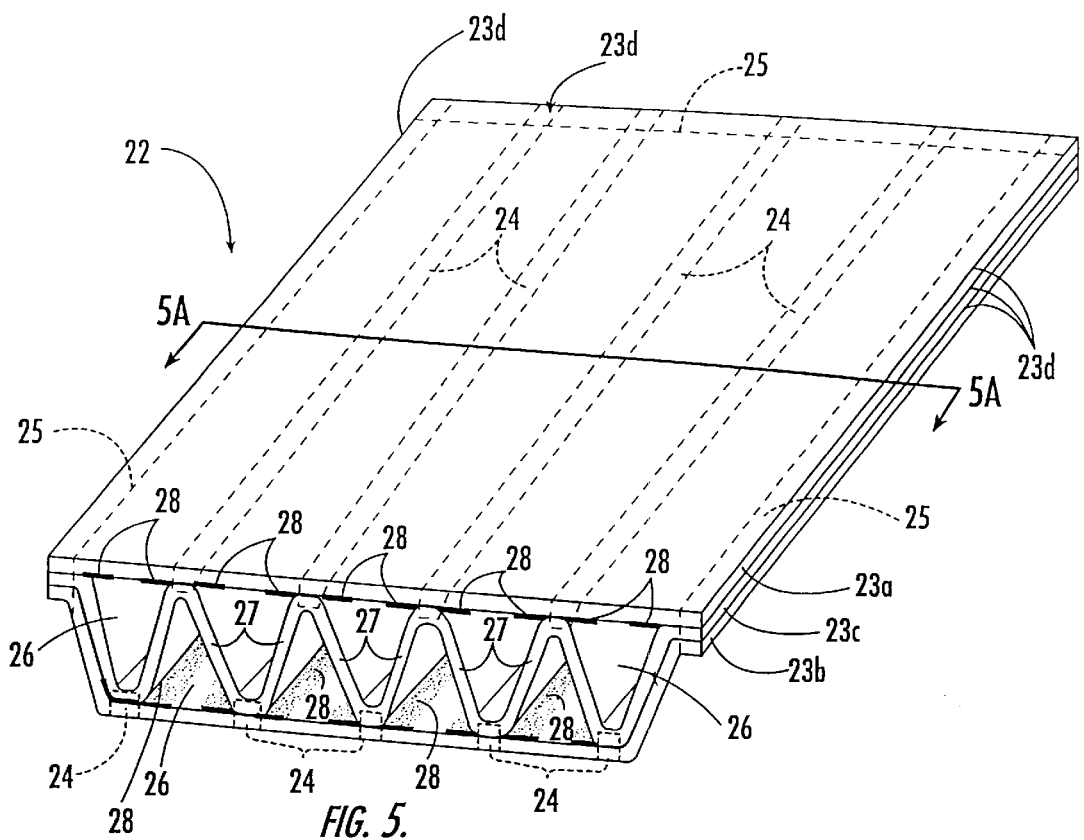
FIG. 5 is a perspective view illustrating a structural assembly, according to one embodiment of the present invention.

Referring now to the drawings and, in particular to FIG. 5, there is illustrated a superplastically formed structural assembly 22, according to one embodiment of the present invention. The structural assembly 22 can be used in a variety of structures, including the primary or secondary structure of an aircraft. The structural assembly 22 illustrated in FIG. 5 includes a first outer structural member 23a, a second outer structural member 23b and an intermediate structural member 23c. One of the outer structural members 23a, b can form the outer skin of an aircraft. Other types of structural assemblies can also be constructed, if so desired, including structural assemblies having only one or two structural members. Assemblies having four or more structural members may also be constructed, including assemblies having first and second outer structural members and a plurality of intermediate structural members. The structural members 23a, b, c can be machined, through known manufacturing methods, into a predetermined shape and thickness, as required by the specific design loads and specifications.

Figure 5A:
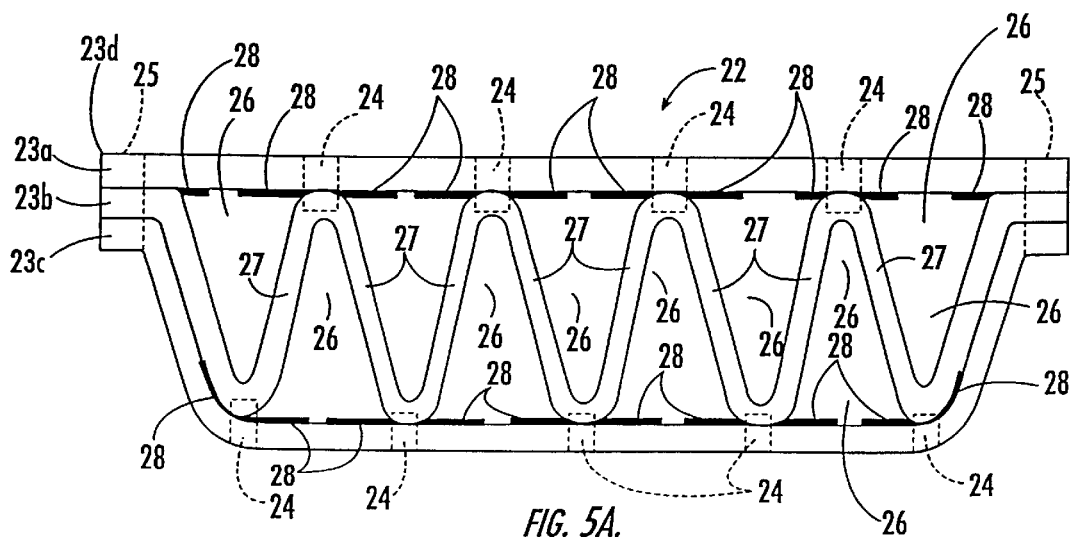
FIG. 5A is a cross-sectional view of the structural assembly of FIG. 5 taken along lines 5A—5A.

Structural assemblies 22 constructed according to the present invention may be formed in a variety of complex three-dimensional shapes having fine details and close tolerances. As illustrated in FIGS. 5 and 5A, the structural members 23a, b, c are joined together along portions of the peripheral edges 23d of the first and second outer structural members 23a, b and the intermediate structural member 23c by full-penetration friction stir weld joints 25. The structural assembly 22 also includes one and, preferably, a plurality of partial-penetration friction stir weld joints 24 joining adjacent structural members 23a, b, c. Specifically, partial-penetration friction stir weld joints 24 join the intermediate structural member 23c to both the first and second outer structural members 23a, b. For structural assemblies containing only two structural members (not shown), the one or more partial-penetration friction stir weld joints joining the structural members are essentially full-penetration friction stir weld joints similar to the weld joints 25 along portions of the peripheral edges 23d of the structural members 23a, b, c illustrated in FIG. 5. For structural assemblies containing four or more structural members (not shown), the first and second outer structural members and the intermediate structural members may be joined to adjacent intermediate structural members by one or more partial-penetration friction stir weld joints.

As illustrated in FIGS. 5 and 5A, the partial-penetration friction stir weld joints 24 preferably define areas 26 therebetween where the facing surfaces of the adjacent structural members 23a, b, c of the structural assembly 22 are spaced apart, which areas are formed when pressurized heated gas is injected into an SPF pack to superplastically form the pack. The spaced-apart areas 26 define a plurality of reinforcing members 27 extending between the first and second outer structural members 23a, b, which can be formed in a variety of different configurations, depending upon the specific design loads and specifications. Similarly, in structural assemblies containing four or more structural members (not shown), reinforcing members can also be formed between the outer structural members and adjacent intermediate structural members, and between pairs of adjacent intermediate structural members.

The structural members 23a, b, c of the structural assembly 22 may be formed of a variety of metals and metal alloys. In one preferred embodiment, the structural members 23a, b, c are formed of an "unweldable" material, which is a material that possesses high conductivity and quickly dissipates heat away from the weld joint and/or that exhibits cracking along the weld joint as a result of stresses caused by thermal expansion. Unweldable materials produce relatively weak weld joints when welded using conventional fusion welding processes and, thus, are for the most part unavailable to designers for use in the construction of SPF packs. Such materials can include titanium, aluminum, aluminum alloys, and some alloys of titanium, particularly Ti-6A1-4V, AA 2000 and 7000 series alloys. Advantageously, many of these materials possess special corrosion, fatigue, strength, or ductility characteristics that are desired in certain applications. In another preferred embodiment, the structural members 23a, b, c are formed of dissimilar metals.

As illustrated in FIG. 5A, at least one facing surface of each pair of adjacent structural members 23a, b, c can be selectively covered with an oxide film 28 such as aluminum oxide ($Al_2O_3$) for structural members formed of aluminum or an aluminum alloy, or titanium oxide ($TiO_2$) for structural members formed of titanium or a titanium alloy. A "selectively oxidized" surface can include a surface that is entirely covered with an oxide film, as well as a surface that is only partially covered with an oxide film. The oxide film 28 preferably corresponds to those regions that will undergo friction stir welding when forming the structural assembly 22. In the embodiment illustrated in FIG. 5A, the surfaces of the first and second outer structural members 23a, b facing the intermediate structural member 23c are partially covered with an oxide film 28. In another embodiment (not shown), the surfaces of the intermediate structural member 23c facing the first and second outer structural members 23a, b can be selectively anodized. In still another embodiment (not shown), the facing surfaces of both adjacent structural members can be selectively covered with an oxide film. For example, referring to FIG. 5A, the facing surfaces of both the first outer structural member 23a and the intermediate structural member 23c and/or the second outer structural member 23b and the intermediate structural member can be at least partially covered with an oxide film.

Advantageously, an oxide film 28 with a thickness on the order of approximately 0.0001 inches, provided the film is continuous, effectively prevents thermo-compression welding of the adjacent structural members 23a, b, c, such that the width of the partial-penetration and full-penetration friction stir weld joints 24, 25 is approximately equal to the width of the rotating friction stir welding probe used to form the weld joint. An example of a conventional friction stir welding tool 15 and probe 18 is illustrated in FIG. 3A. Preferably, the oxide film 28 is less than approximately 0.001 inches. It has been found that the oxide film 28 does not appreciably affect the material properties of the resulting partial-penetration and full-penetration friction stir welding joints 24, 25, as the gross plastic deformation generated by the rotating friction stir welding probe as it moves through the interface between adjacent structural members 23a, b, c is sufficient to break up the oxide layer and effect a sound weld.

Aluminum and titanium, and their alloys, typically grow a natural oxide film, which is approximately 5 nm thick in dry air at room temperature for aluminum. However, the growth of the natural oxide film for both aluminum and titanium, and their alloys, is self-limiting and is not sufficiently thick to prevent thermo-compression welding of adjacent structural members when forming full-penetration and partial-penetration friction stir weld joints. In order to form an oxide film of sufficient thickness, the structural member or members 23a, b, c must undergo an oxidation process referred to as anodizing or anodic oxidation, as is known in the art. During anodic oxidation, the structural member 23a, b, c being anodized is immersed in an anodize bath as the anode in an electrolytic cell, resulting in the aluminum or titanium atoms on the surface of the structural member chemically adsorbing oxygen from the bath. The anodize bath is typically an electrically conductive acid, such as chromic acid, boric-sulfuric acid, or sulfuric acid. Other acid anodizing substances, which are known in the art, may also be used.

According to one embodiment, the selective anodizing process can include cleaning and deoxidizing the facing surface of the structural member(s) 23a, b, c, on which the oxide film 28 is to be formed with a detergent combined with either an alkaline or acid cleanser, as is known in the art. Preferably, the cleanser is an electrocleaner that is applied to the surface of the structural member at between 8 to 15 volts for 3 to 5 minutes. Such cleansers can include DALIC®1010 distributed by Brooktronics Engineering Corp., North Hollywood, Calif., SCM 4100 distributed by SIFCO Industries Incorporated, Cleveland, Ohio, and LDC-01 distributed by Liquid Development Co., Incorporated, Cleveland, Ohio. After cleaning and deoxidizing, the surface of the structural member 23a, b, c, on which the oxide film 28 is to be formed is water rinsed to remove the cleansing solution. The surface of the structural member 23a, b, c is sufficiently clean when the water on the surface of the structural member maintains a continuous film, i.e., remains break-free, for 30 seconds after discontinuing the water rinse. The surface of the structural member 23a, b, c, on which the oxide film 28 is to be formed is preferably maintained wet until anodizing starts.

Figure 6A:
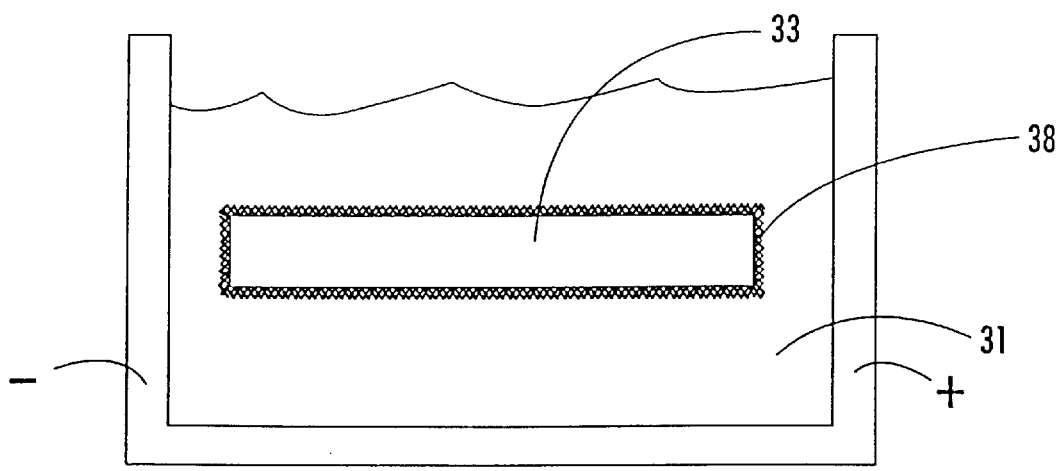
FIG. 6A is a cross-sectional view illustrating the formation of an oxide film on the surface of a structural member, according to one embodiment of the present invention.

As noted above, a selectively anodized surface can include a surface that is entirely covered with an oxide film, as well as a surface that is only partially covered with an oxide film. According to one embodiment, as illustrated in FIG. 6A, the entire structural member 33 on which the oxide film 38 is to be formed can be submerged in an acidic bath 31. Once submerged, the voltage across the structural member 33, which comprises the anode of the electrolytic circuit, is increased. For example, for a structural member formed of aluminum or an aluminum alloy, the acidic bath 31 can include chromic acid, boric-sulfuric acid, or sulfuric acid, having a temperature of between 60° and 80° Fahrenheit. The voltage across an aluminum or aluminum alloy structural member is preferably increased from 0 volts to a maximum voltage of between 21 to 30 volts at a rate of 3 to 4 volts per minute or 1.5 to 2 volts per 30 seconds with an average current density of between 0.35 and 0.45 amps/in$^2$ and a maximum current density of between 0.42 and 0.50 amps/in$^2$. Once the maximum desired voltage is reached, the structural member 33 is anodized for a predetermined ampere-hour or anodize time, based upon the desired thickness of the oxide layer 38. The maximum voltage, average current density, maximum current density, and anodize time are dependent upon the composition of the structural member 33, as well as the solution used as the acidic bath, as is known in the art. According to this embodiment, the entire surface of the structural member 33 is coated with an oxide film 38.

Figure 6B:
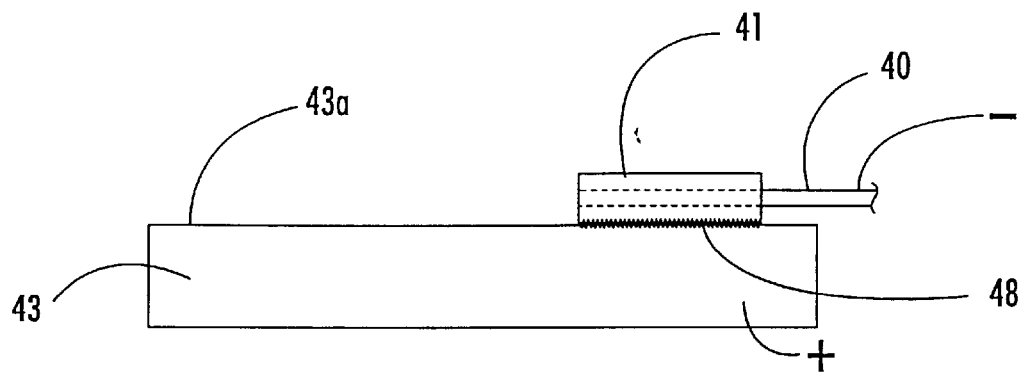
FIG. 6B is a cross-sectional view illustrating the formation of an oxide film on the surface of a structural member, according to another embodiment of the present invention.

In another embodiment, as illustrated in FIG. 6B, the surface 43a of the structural member 43 on which the oxide film 48 is to be formed is selectively anodized using a process known in the art as brush anodizing. During brush anodizing, a hand-held electrode 40 is prepared in which a portion of the electrode is wrapped in cotton, polyester, or polypropylene 41. The wrap is saturated with an acidic solution either by dipping or pump feed and then brought into contact with and moved over the surface(s) of the structural member on which the oxide film 48 is to be formed as the voltage across the structural member 43, which comprises the anode of the electrolytic circuit, is increased. For example, for a structural member formed of aluminum or an aluminum alloy, the wrap is saturated with an acidic solution 41 comprising chromic acid, boric-sulfuric acid, or sulfuric acid, having a temperature of between 60° and 80° Fahrenheit. The voltage across an aluminum or aluminum alloy structural member is preferably increased from 0 volts to a maximum voltage of between 21 to 30 volts at a rate of 3 to 4 volts per minute or 1.5 to 2 volts per 30 seconds with an average current density of between 0.35 and 0.45 amps/in$^2$ and a maximum current density of between 0.42 and 0.50 amps/in$^2$. Once the maximum desired voltage is reached, the structural member 43 is anodized for a predetermined ampere-hour or anodize time, based upon the desired thickness of the oxide layer 48. The maximum voltage, average current density, maximum current density, and anodize time are dependent upon the composition of the structural member 43, as well as the solution used as the acidic bath, as is known in the art. According to this embodiment, only select portions of the surface of the structural member 43 are coated with an oxide film 48.

Figure 6C:
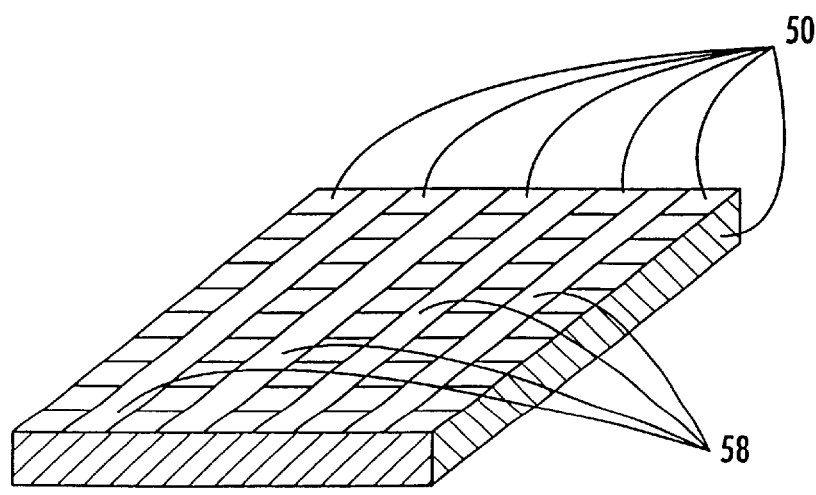
FIG. 6C is a cross-sectional view illustrating the formation of an oxide film on the surface of a structural member, according to still another embodiment of the present invention.

In another embodiment, as illustrated in FIG. 6C, the surfaces of the structural member 53 are coated with a masking material 50, except for those surfaces 58 on which the oxide film is to be formed. Thereafter, the exposed surfaces 58 of the structural member 53 are anodized either by submersion in an acid bath, as illustrated in FIG. 6A, or by brush anodizing, as illustrated in FIG. 6B, both of which are discussed above.

Referring to FIGS. 7A–7F, there are illustrated, according to one embodiment of the present invention, the steps of constructing a forming pack 30 that can be superplastically formed into a structural assembly. As discussed above, the facing surface of at least one structural member 23a, b, c from each pair of adjacent structural members in the forming pack 30 can be selectively anodized to thereby prevent thermo-compression welding between the adjacent structural members. The structural members 23a, b, c are selectively joined together to form the sealed forming pack 30. The selective joining step includes joining the structural members together by partial-penetration and full-penetration friction stir weld joints 24, 25 and attaching to or between the structural members plumbing fittings 42 to enable the forming pack 30 to be inflated during the superplastic forming process. According to one embodiment, as illustrated in FIGS. 7A–7E, the selective joining step includes joining strips of fusion weldable material 29a, b, c to corresponding first edges 32 of the structural members 23a, b, c. Fusion weldable materials produce relatively strong weld joints when welded using conventional fusion welding processes and preferably include low carbon steel and some alloys of titanium. Since the structural members 23a, b, c may be formed of unweldable materials, i.e., materials that produce relatively weak weld joints when welded using conventional fusion welding processes, the fusion weldable strips 29a, b, c are preferably joined to the first edges 32 of the structural members by forming friction stir weld butt joints 34 between the structural members and the corresponding strips of fusion weldable material.

Figure 7A:
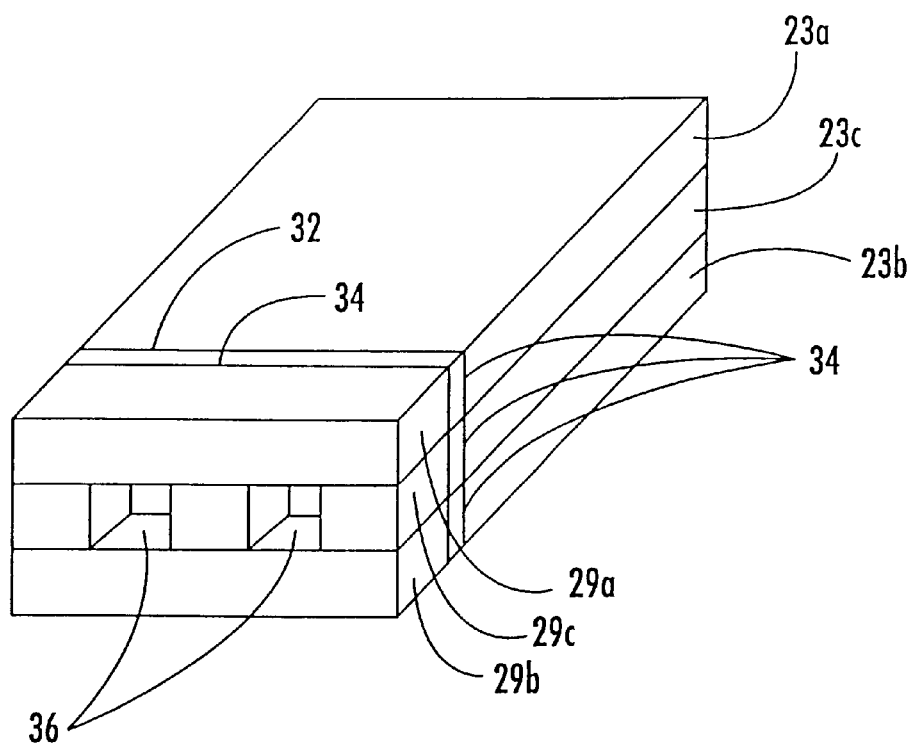
FIG. 7A is a perspective view illustrating the construction of a forming pack, according to one embodiment of the present invention.
Figure 7B:
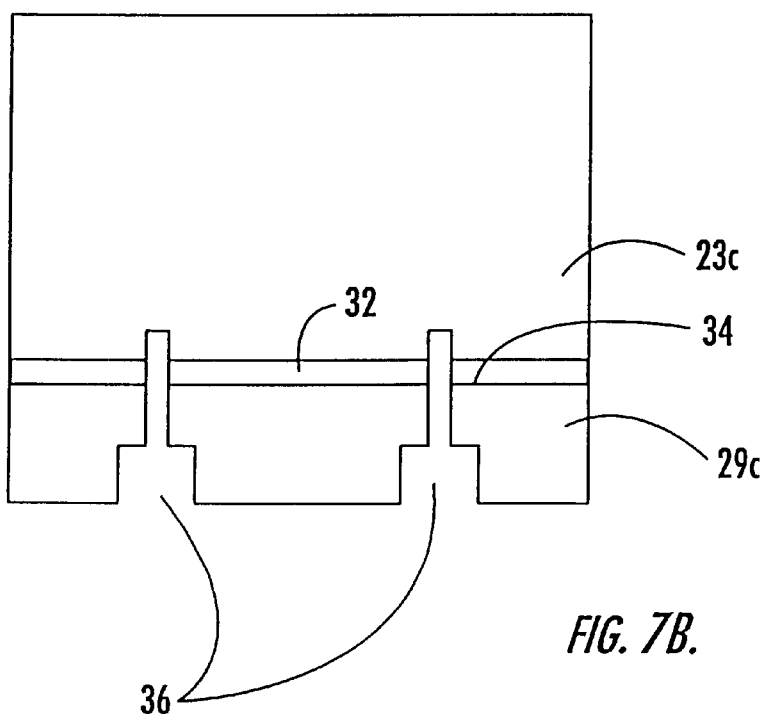
FIG. 7B is a plan view illustrating the cutouts machined into the first edge of the intermediate structural member and the corresponding strip of fusion weldable material of FIG. 7A.
Figure 7D:
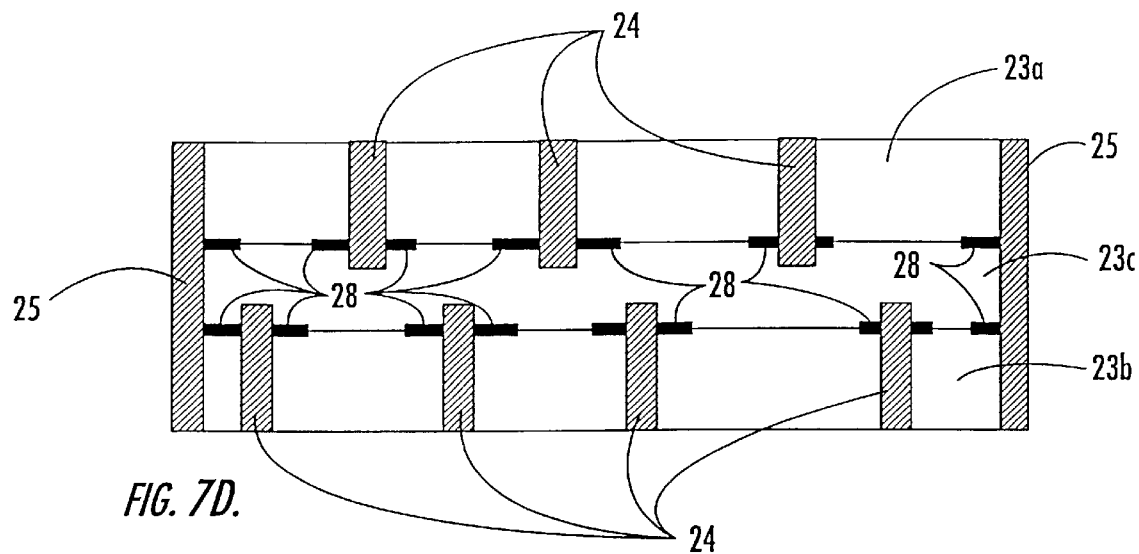
FIG. 7D is a cross-sectional view of the stacked structural members of FIG. 7C illustrating the selectively anodized surfaces of the adjacent structural members.
Figure 7C:
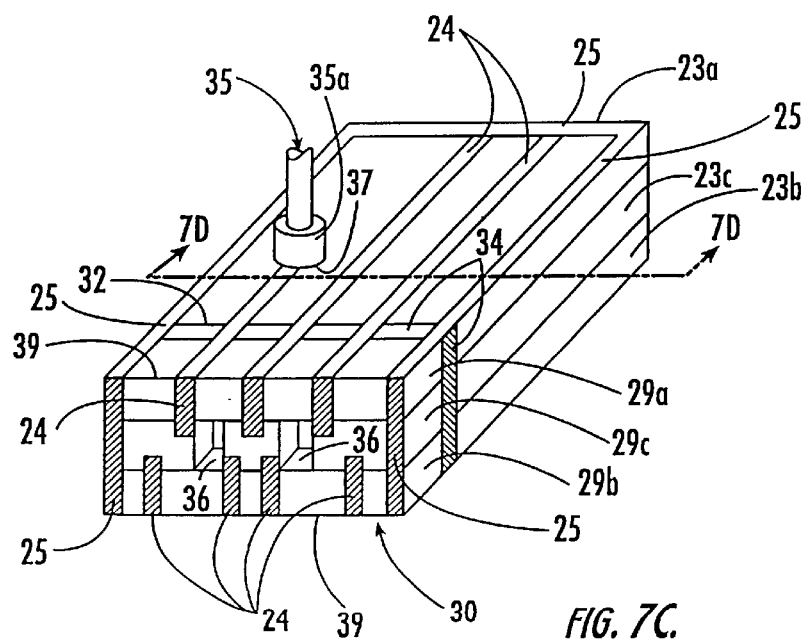
FIG. 7C is a perspective view illustrating the formation of partial-penetration and full-penetration friction stir weld joints between the structural members of FIG. 7A.
Figure 7E:
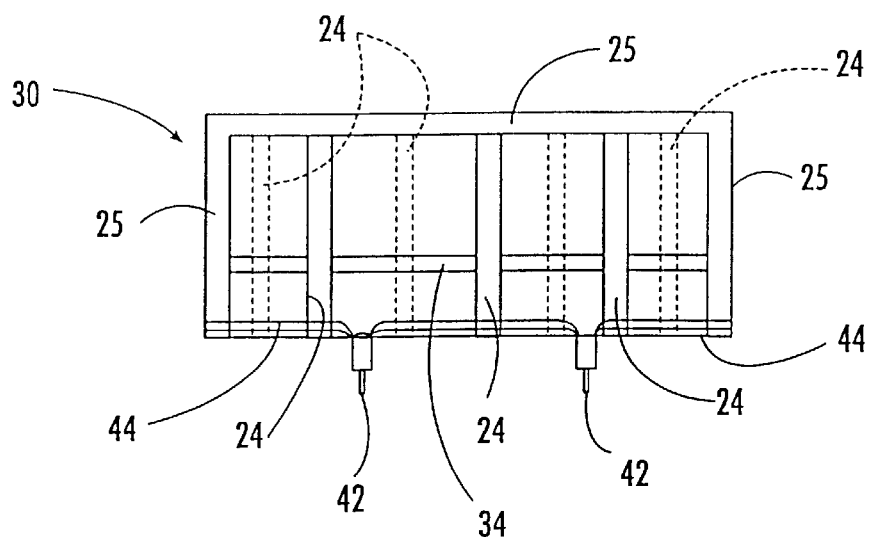
FIG. 7E is a plan view of the stacked structural members of FIG. 7C illustrating the attachment of the plumbing fittings to, and sealing of, the forming pack.

One or more cutouts 36 can be machined into at least one fusion weldable strip 29a, b, c and the first edge 32 of the corresponding structural member 23a, b, c, using known machining methods. The cutouts 36 will be in fluid communication with the interior region or regions between the adjacent structural members 23a, b, c when the structural members are stacked. As illustrated in FIG. 7E, the cutouts 36 will receive plumbing fittings 42 that will channel pressurized gas into the interior of the forming pack 30 during the superplastic forming process. As illustrated in FIGS. 7A and 7B, for structural assemblies having three or more structural members, the cutouts 36 are preferably machined into the fusion weldable strip 29c corresponding to an intermediate structural member 23c, although the cutouts 36 may also be machined into a fusion weldable strip 29a, b corresponding to an outer structural member 23a, b.

As illustrated in FIG. 7A, the structural members 23a, b, c are stacked such that any intermediate structural members 23c are positioned between the first and second outer structural members 23a, b. The structural members 23a, b, c may be secured to a worktable by means of a conventional clamp (not shown). The step of selectively joining the structural members 23a, b, c, also includes forming one or more partial-penetration friction stir weld joints 24 between pairs of adjacent structural members. As illustrated in FIG. 7C, for a structural assembly having three structural members 23a, b, c, partial-penetration friction stir weld joints 24 are formed between the intermediate structural member 23c and the first and second outer structural members 23a, b, respectively. In one embodiment, a rotating friction stir welding probe 37, which is attached to the shoulder 35a of a friction stir weld tool 35, is forced in turn through the outer surface of the first and second outer structural members 23a, b and into the intermediate structural member 23c to form the partial-penetration weld joints 24. In an alternate embodiment, the intermediate structural member 23c and the second outer structural member 23b are stacked and partial-penetration friction stir weld joints 24 are formed by forcing the rotating friction stir welding probe 37 through the outer surface of the intermediate structural member 23c and into the second outer structural member 23b. Thereafter, the first outer structural member 23a is stacked onto the intermediate structural member 23c and partial-penetration friction stir weld joints 24 are formed by forcing the rotating friction stir welding probe 37 through the outer surface of the first outer structural member 23a and into the intermediate structural member 23c. By stacking additional structural members and then forming partial-penetration friction stir weld joints between the adjacent structural members, structural assemblies having four or more structural members can be constructed according to the present invention.

As illustrated in FIG. 7C, in order to seal the structural members 23a, b, c to form a sealed forming pack 30, the selective joining step also includes forming full-penetration friction stir weld joints 25 along a portion of the peripheral edges of the structural members 23a, b, c and the strips of fusion weldable material 29a, b, c. In one embodiment, a rotating friction stir welding probe 37 is forced in turn through the outer surface of the first outer structural member 23a, into and through the intermediate structural member 23c, and into the second outer structural member 23b to form the full-penetration weld joints 25. The peripheral edges of the strips of fusion weldable material 29a, b, c opposite the first edges 32 of the structural members 23a, b, c define a non-welded plumbing edge 39 that is not sealed with a full-penetration friction stir weld joint 25. As such, the structural members 23a, b, c are sealed on all peripheral edges except for the first edges 32 of the structural members, which are the edges welded to the strips of fusion weldable material 29a, b, c, and which edges are in fluid communication with the cutouts 36 for the plumbing fittings 42.

As discussed above, and as illustrated in FIG. 7D, at least one facing surface of each pair of adjacent structural members 23a, b, c is selectively covered with an oxide film 28, which oxide film coincides with the location of the one or more partial-penetration and full-penetration friction stir weld joints 24, 25 to thereby prevent thermo-compression welding of the adjacent structural members and, thus, maintain the width of the weld joints approximately equal to the width of the friction stir welding probe 37.

As illustrated in FIG. 7E, the step of selectively joining the structural members 23a, b, c, also includes securing a plumbing fitting 42 within each cutout 36 machined into the strip or strips of fusion weldable material 29a, b, c and the first edge 32 of the corresponding structural members 23a, b, c. The plumbing fittings 42 are inserted into the cutouts 36 so that the fittings 42 will be in fluid communication with the interior of the sealed forming pack 30. Advantageously, a fusion weld joint 44 can be formed along a least a portion of the plumbing edge 39 of the strips of fusion weldable material 29a, b, c, thus, effectively sealing the remaining peripheral edge of the structural members 23a, b, c to form a sealed forming pack 30 and securing and sealing the plumbing fittings 42 within the forming pack without impinging upon and damaging the fittings.

Figure 7F:
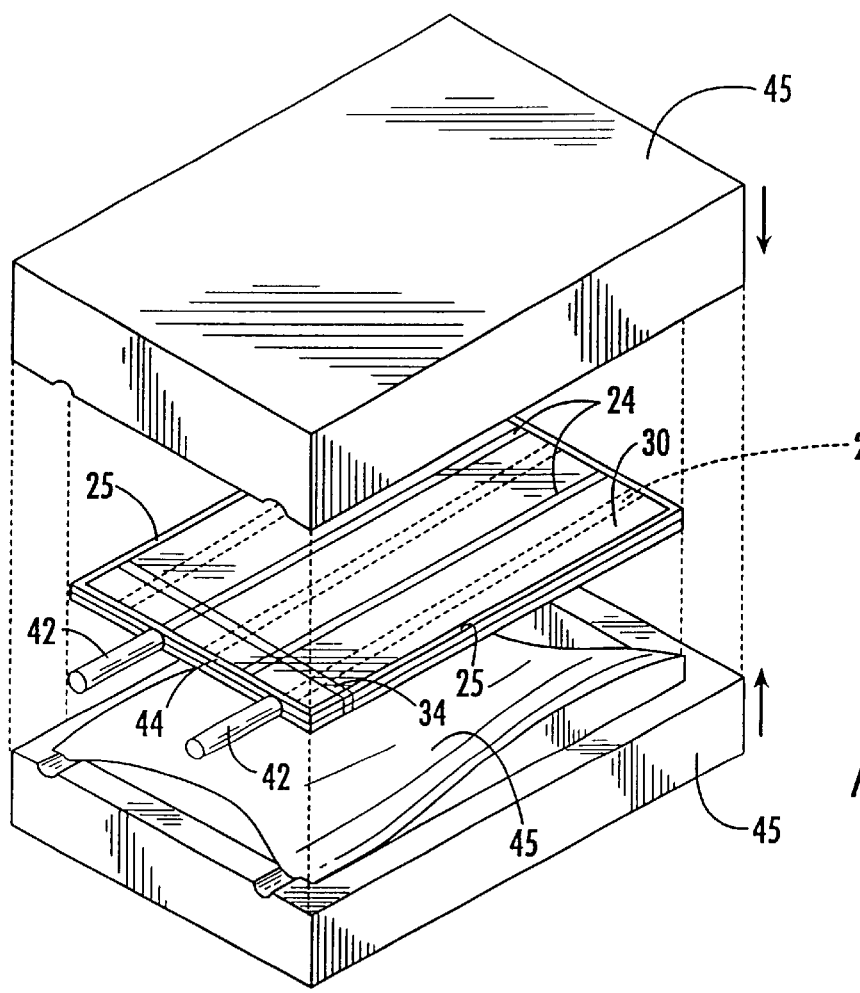
FIG. 7F is a perspective view illustrating the positioning of the sealed forming pack within the containment die.

Thereafter, as illustrated in FIG. 7F, the sealed forming pack 30 is superplastically formed to form a structural assembly, such as the one illustrated in FIG. 5. In one embodiment, the superplastic forming step includes positioning the sealed forming pack 30 in a shaped containment die 45, as is known in the art. A pressure differential is created between the interior and exterior of the forming pack 30. The pressure differential applied is preferably sufficient to subject the forming pack to strain within a predetermined strain range. The pressure differential is generally created by injecting fluid, such as inert gas, through the plumbing fittings 42, thereby increasing the fluid pressure within the interior of the forming pack 30. Concurrently with the establishment of a pressure differential between the interior and exterior of the forming pack 30, the forming pack is heated, according to a predetermined temperature schedule, to a temperature within the superplastic temperature range of the material forming the structural members 23a, b, c of the forming pack. Thus, the forming pack superplastically deforms to the predetermined shape defined by the cavity of the containment die 45 to form a structural assembly. The structural assembly can be removed from the containment die and allowed to cool. Thereafter, final machining steps may be performed, including removing the strips of fusion weldable material 29a, b, c and the plumbing fittings 42, as is known in the art.

Referring to FIGS. 8A–8E, there are illustrated, the steps of selectively joining the structural members 63a, b, c to construct a sealed forming pack 30, according to another embodiment of the present invention. As discussed above, the facing surface of at least one structural member 63a, b, c from each pair of adjacent structural members in the forming pack 60 can be selectively anodized to thereby prevent thermo-compression welding between the adjacent structural members. The structural members 63a, b, c are selectively joined together to form the sealed forming pack 60. The selective joining step includes joining the structural members together by partial penetration and full penetration friction stir weld joints 64, 65 and attaching to the structural members plumbing fittings 72 to enable the forming pack 60 to be inflated during the superplastic forming process.

Figure 8A:
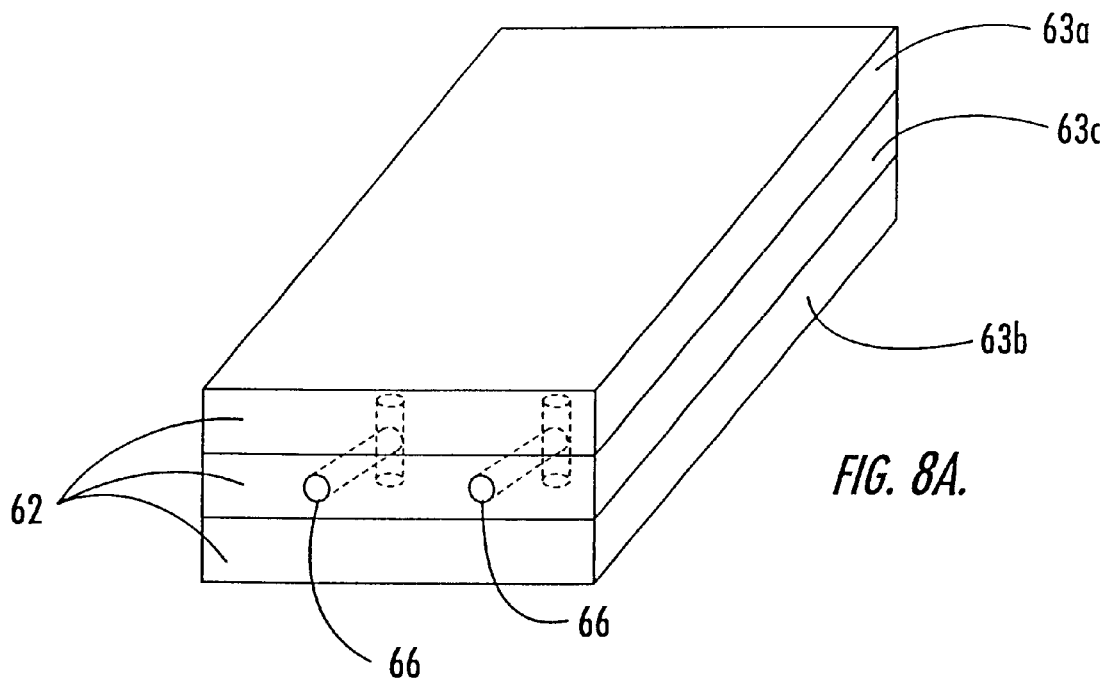
FIG. 8A is a perspective view illustrating the construction of a forming pack, according to one embodiment of the present invention.
Figure 8B:
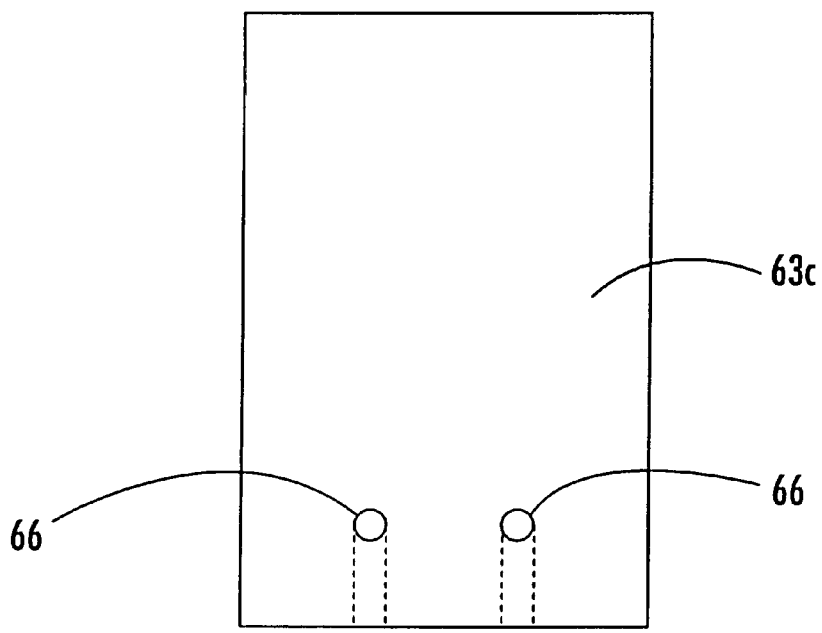
FIG. 8B is a plan view illustrating the cutouts machined into the intermediate structural member of FIG. 8A.
Figure 8C:
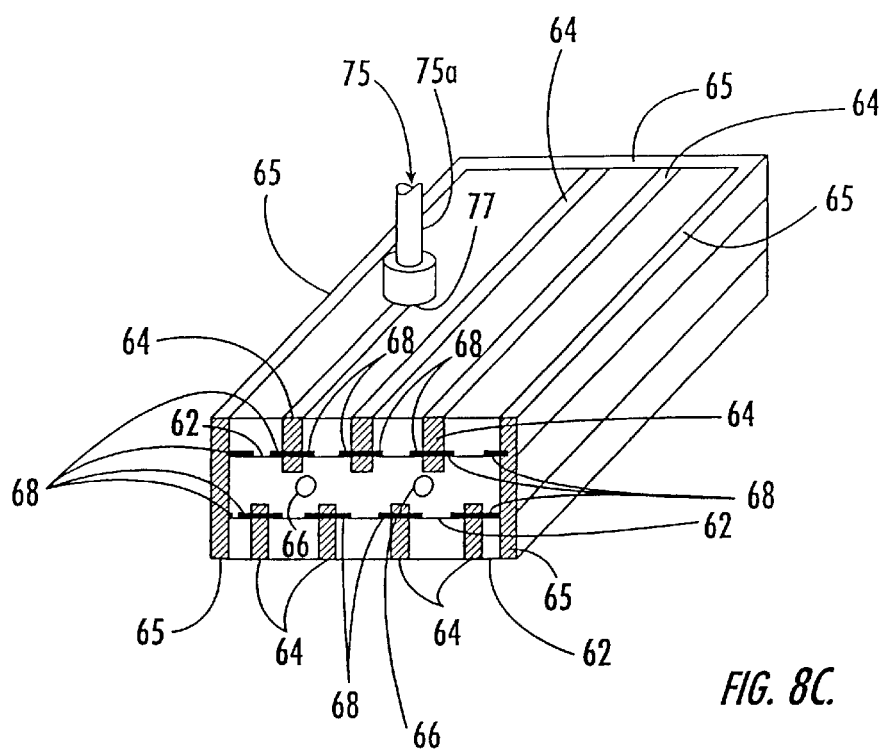
FIG. 8C is a perspective view illustrating the formation of partial-penetration and full-penetration friction stir weld joints between the structural members of FIG. 8A.
Figure 8D:
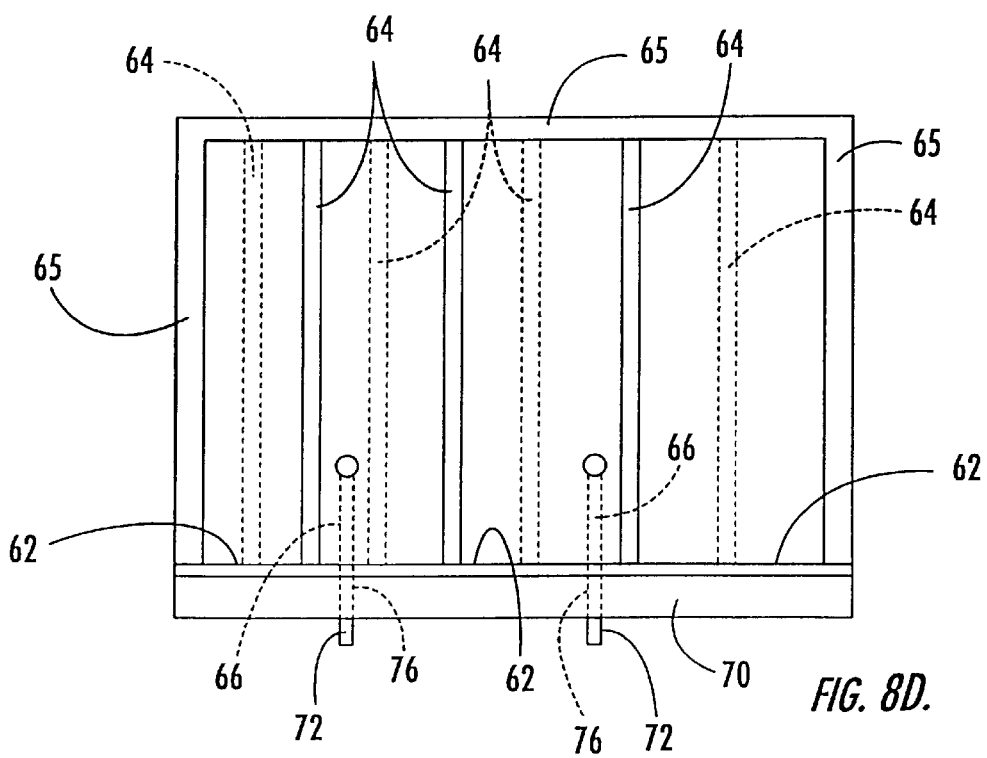
FIG. 8D is a plan view of the stacked structural members of FIG. 8C illustrating the attachment of the edge member and plumbing fittings to the structural members of FIG. 8A and the sealing of the forming pack.

As illustrated in FIGS. 8A and 8B, the selective joining step includes machining one or more primary cutouts or fluid passage ways 66 into the first edge 62 of at least one structural member 63a, b, c, using known machining methods. The cutouts 66 will be in fluid communication with the interior region between the adjacent structural members 63a, b, c when the structural members are stacked. As illustrated in FIG. 8D, the cutouts 66 will receive plumbing fittings 72 that will channel pressurized gas into the interior of the forming pack 60 during the superplastic forming process. As illustrated in FIGS. 8A and 8B, for structural assemblies having three or more structural members 63, the cutouts 66 are preferably machined into the first edge 62 of the intermediate structural member 63c, although the cutouts 66 may also be machined into the first edge 62 of an outer structural member 63a, b or between adjacent structural members.

As illustrated in FIG. 8A, the structural members 63a, b, c are stacked such that any intermediate structural members 63c are positioned between the first and second outer structural members 63a, b. The structural members 63a, b, c may be secured to a worktable by means of a conventional clamp (not shown). The step of selectively joining the structural members 63a, b, c, also includes forming one or more partial-penetration friction stir weld joints 64 between pairs of adjacent structural members. As illustrated in FIG. 8C, for a structural assembly having three structural members 63a, b, c, partial-penetration friction stir weld joints 64 are formed between the intermediate structural member 63c and the first and second outer structural members 63a, b, respectively. In one embodiment, a rotating friction stir welding probe 77, which is attached to the shoulder 75a of a friction stir weld tool 75, is forced in turn through the outer surface of the first and second outer structural members 63a, b and into the intermediate structural member 63c to form the partial-penetration weld joints 64. In an alternate embodiment, the intermediate structural member 63c and the second outer structural member 63b are stacked and partial-penetration friction stir weld joints 64 are formed by forcing the rotating friction stir welding probe 77 through the outer surface of the intermediate structural member 63c and into the second outer structural member 63b. Thereafter, the first outer structural member 63a is stacked onto the intermediate structural member 63c and partial-penetration friction stir weld joints 64 are formed by forcing the rotating friction stir welding probe 77 through the outer surface of the first outer structural member 63a and into the intermediate structural member 63c. By stacking additional structural members and then forming partial-penetration friction stir weld joints between the adjacent structural members, structural assemblies having four or more structural members can be constructed according to the present invention.

As illustrated in FIG. 8C, in order to seal the structural members 63a, b, c to form a sealed forming pack 60, the selective joining step also includes forming full-penetration friction stir weld joints 65 along a portion of the peripheral edges of the structural members 63a, b, c. In one embodiment, a rotating friction stir welding probe 77 is forced in turn through the outer surface of the first outer structural member 63a, into and through the intermediate structural member 63c , and into the second outer structural member 63b to form the full-penetration weld joints 65. The first edges 62 of the structural members 63a, b, c define a non-welded plumbing edge 69 that is not sealed with a full-penetration friction stir weld joint 65. As such, the structural members 63a, b, c are sealed on all peripheral edges except for the first edges 62 of the structural members, at least one of which defines cutouts 66 for the plumbing fittings 72. Advantageously, as illustrated in FIG. 8C, at least one facing surface of each pair of adjacent structural members 63a, b, c is selectively covered with an oxide film 68, which oxide film coincides with the location of the one or more partial-penetration and full penetration friction stir weld joints 64, 65 to thereby prevent thermo-compression welding of the adjacent structural members and, thus, maintain the width of the weld joints approximately equal to the width of the friction stir welding probe 77.

As illustrated in FIG. 8D, the step of selectively joining the structural members 63a, b, c, also includes securing a solid edge member 70 to the first edges 62 of the structural members. The solid edge member 70 is preferably formed of a weldable material, such as low carbon steel and some alloys of titanium. Since the structural members 63a, b, c may be formed of unweldable materials, i.e., materials that produce relatively weak weld joints when welded using conventional fusion welding processes, the solid edge member 70 is preferably joined to the first edges 62 of the structural members 63a, b, c by forming a friction stir weld butt joint 74 between the structural members and the edge member. The first edges 62 of the structural members 63a, b, c are preferably machined flush using known machining methods prior to securing the solid edge member 70. Advantageously, the solid edge member 70 effectively seals the remaining peripheral edges of the structural members 63a, b, c to form a sealed forming pack 60.

Using known machining methods, secondary cutouts or fluid passage ways 76 are machined through the solid edge member 70, which cutouts 76 correspond to, and are in fluid communication with, the cutouts 66 machined into the first edge 62 of at least one of the structural members 63a, b, c. The cutouts 76 in the edge member 70 are preferably machined through the edge member after the edge member is secured to the first edges 62 of the structural members 63a, b, c, although the cutouts 76 may be machined prior to welding the edge member to the structural members.

As illustrated in FIG. 8D, the step of selectively joining the structural members 63a, b, c, also includes securing a plumbing fitting 72 within each cutout 76 machined into the solid edge member 70 and the first edge 62 of the corresponding structural members 63a, b, c. The plumbing fittings 72 are inserted into the cutouts 66, 76 so that the fittings 72 will be in fluid communication with the interior of the sealed forming pack 60. A fusion weld joint 73 can be formed around the plumbing fittings 72, thus, securing and sealing the fittings within the forming pack 60 without impinging upon and damaging the fittings. Thereafter, as discussed above, the sealed forming pack 60 is superplastically formed to form a structural assembly.

Figure 13A:
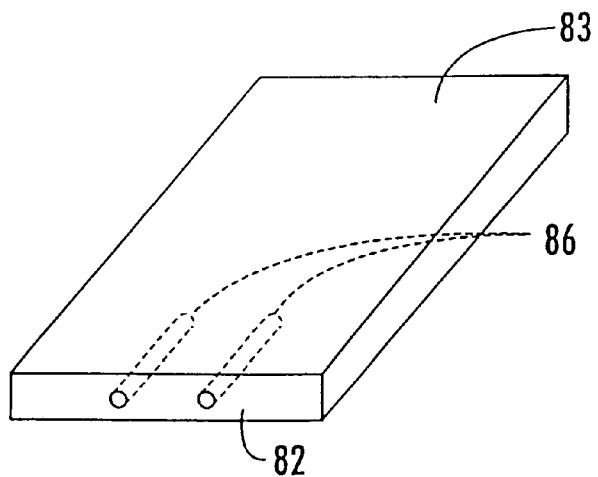
FIG. 13A is a perspective view illustrating the construction of a forming pack, according to one embodiment of the present invention.
Figure 13B:
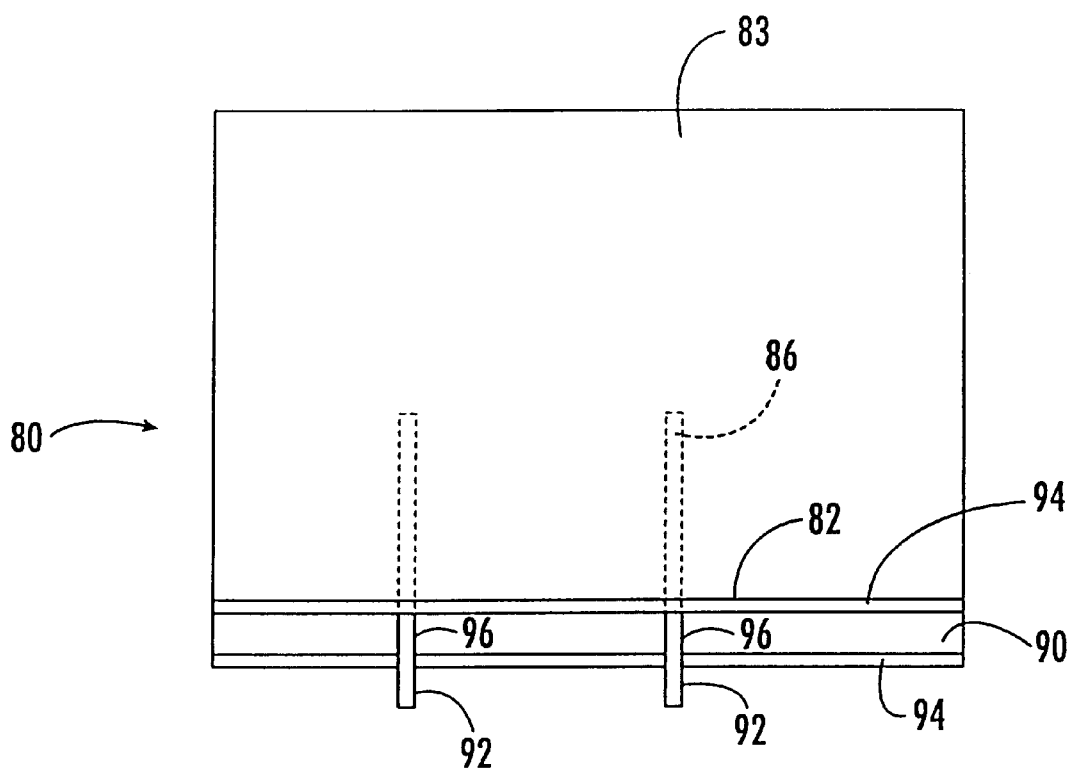
FIG. 13B is a plan view illustrating the cutouts machined into the edge member and the plumbing fittings of the forming pack of FIG. 13A.

Referring now to FIGS. 13A and 13B, there are illustrated, the steps of constructing a forming pack 80 that can be superplastically formed into a structural assembly 82, according to another embodiment of the present invention. As illustrated in FIG. 13A, one or more primary cutouts or fluid passage ways 86 are machined into the first edge 82a of a single structural member 83, using known machining methods. The cutouts 86 will be in fluid communication with the interior of the structural member 83. As illustrated in FIG. 13B, the cutouts 86 will receive plumbing fittings 92 that will channel pressurized gas into the interior of the forming pack 80 during the superplastic forming process. As discussed above and illustrated in FIG. 13B, a strip of fushion weldable material or edge member 90 is joined to the first edge 82a of the structural member 83 by forming a friction stir weld butt joint 94 between the structural member 83 and the edge member 90. Using known machining methods, secondary cutouts or fluid passage ways 96 are machined through the edge member 90, which cutouts 96 correspond to, and are in fluid communication with, the cutouts 86 machined into the first edge 82a of the structural member 83. The cutouts 96 in the edge member 90 are preferably machined through the edge member after the edge member is secured to the first edge 82a of the structural member 83, although the cutouts 96 may be machined prior to welding the edge member to the structural member. In an alternate embodiment (not shown), the step of machining the cutouts 86 is omitted and the cutouts 96 are machined through the edge member 96, into the first edge 82a of the structural member 83, and into the interior of the structural member.

Figure 13C:
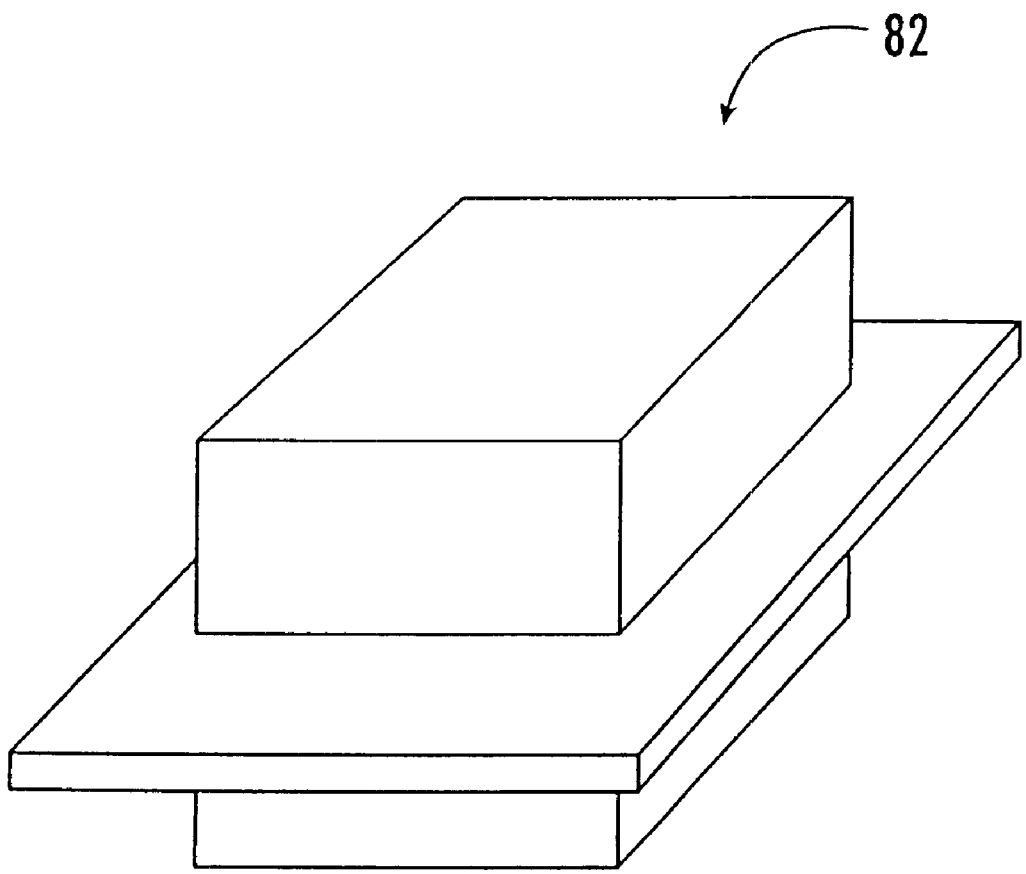
FIG. 13C is a perspective view illustrating a structural assembly formed from the forming pack of FIG. 13B.

As illustrated in FIG. 13B, a plumbing fitting 92 is secured within each cutout 96 machined into the edge member 90 and the first edge 82 of the structural member 83. The plumbing fittings 92 are inserted into the cutouts 86, 96 so that the fittings 92 will be in fluid communication with the interior of the structural member, which advantageously comprises the sealed forming pack 80. A fusion weld joint 94 can be formed around the plumbing fittings 92, thus, securing and sealing the fittings within the forming pack 80 without impinging upon and damaging the fittings. Thereafter, as discussed above, the sealed forming pack 80 is superplastically formed to form a structural assembly 82, as illustrated in FIG. 13C. For example, the pack 80 could be expanded into identical, mirror-image dies. After forming, the structural assembly 82 could be cut apart into two independent, single sheet components or used as a unitary component.

Figure 9:
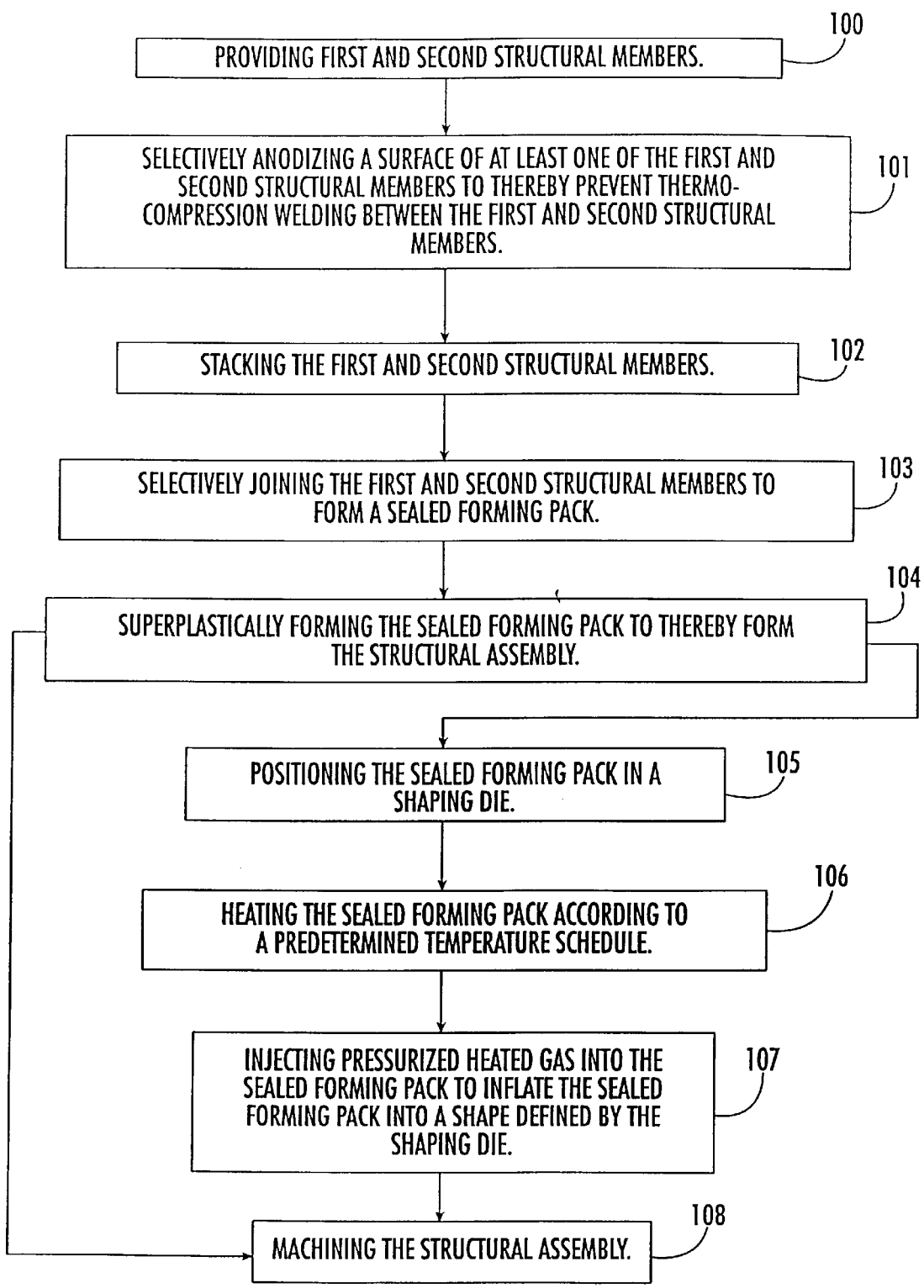
FIG. 9 is a flow chart illustrating the steps for manufacturing a structural assembly, according to one embodiment of the present invention.

The present invention also provides a method of manufacturing a structural assembly. In one embodiment, as illustrated in FIG. 9, the method includes the steps of providing first and second structural members. See block 100. Advantageously, a surface of at least one of the first and second structural members is selectively anodized to thereby prevent thermo-compression welding between the first and second structural members. See block 101. The first and second structural members are stacked and then selectively joined to form a sealed forming pack. See blocks 102 and 103. The sealed forming pack is then superplastically formed to thereby form the structural assembly. See block 104. The structural assembly may be machined after the superplastic-forming step. See block 108.

In one embodiment, as illustrated in FIGS. 9, 10, 11, 11A, and 12, the superplastic-forming step may include positioning the sealed forming pack in a shaping die. See blocks 105, 113, 126, 139, and 153. The sealed forming pack is then heated according to a predetermined temperature schedule. See block 106, 114, 127, 140, and 154. Following the heating step, pressurized heated gas is injected into the sealed forming pack to inflate the sealed forming pack into a shape defined by the shaping die. See block 107, 115, 128, 141, and 155.

Figure 10:
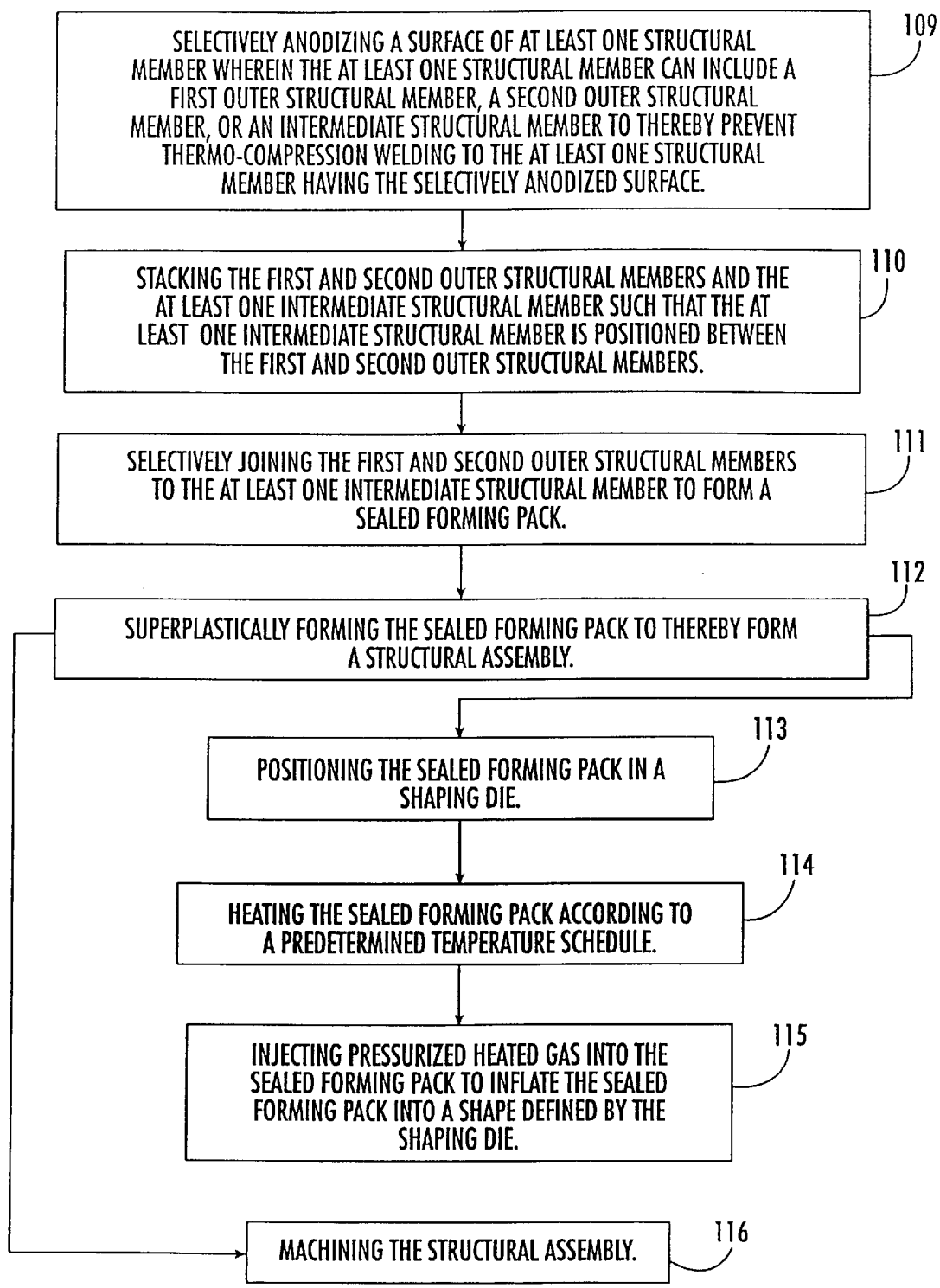
FIG. 10 is a flow chart illustrating the steps for manufacturing a structural assembly, according to another embodiment of the present invention.

In another embodiment, as illustrated in FIG. 10, the method of manufacturing includes the steps of selectively anodizing a surface of at least one structural member, which structural member can include a first outer structural member, a second outer structural member, or at least one intermediate structural member, to thereby prevent thermo-compression welding to the at least one structural member having the selectively anodized surface. See block 109. The first and second outer structural members and the at least one intermediate structural member are then stacked such that the at least one intermediate structural member is positioned between the first and second outer structural members. See block 110. The first and second outer structural members are then selectively joined to the at least one intermediate structural member to form a sealed forming pack. See block 111. The sealed forming pack is then superplastically formed to thereby form a structural assembly. See block 112. The structural assembly may be machined after the superplastic-forming step. See block 116.

In still another embodiment, the method of manufacturing a structural assembly includes the steps of joining strips of fusion weldable material to corresponding first edges of first and second structural members. See block 117. The first and second structural members are then stacked such that the strips of fusion weldable material attached to the corresponding first edges of the first and second structural members are superimposed. See block 120. After the stacking step, full-penetration friction stir weld joints are formed along a portion of the peripheral edges of the first and second structural members and the strips of fusion weldable material to thereby define a non-welded plumbing edge along the strips of fusion weldable material. See block 122. Plumbing fittings are at least partially inserted into the plumbing edge of the strips of fusion weldable material. See block 123. In one embodiment, prior to the stacking step, cutouts can be machined in the plumbing edge of at least one of the strips of fusion weldable material to receive the plumbing fittings. See block 119. After the inserting step, a fusion weld joint is formed along at least a portion of the plumbing edge of the strips of fusion weldable material such that the plumbing fittings are sealed between the strips of fusion weldable material. See block 124. The first and second structural members are then superplastically formed to thereby form the structural assembly. See block 125. The strips of fusion weldable material attached to the corresponding first edges of the first and second structural members can be machined away after the superplastic-forming step. See block 129. In one embodiment, at least one partial-penetration friction stir weld joint is formed between the first and second structural members after the stacking step. See block 121. Prior to the partial-penetration weld joint forming step, the surface of at least one of the first and second structural members may be selectively anodized. See block 118.

Figure 11:
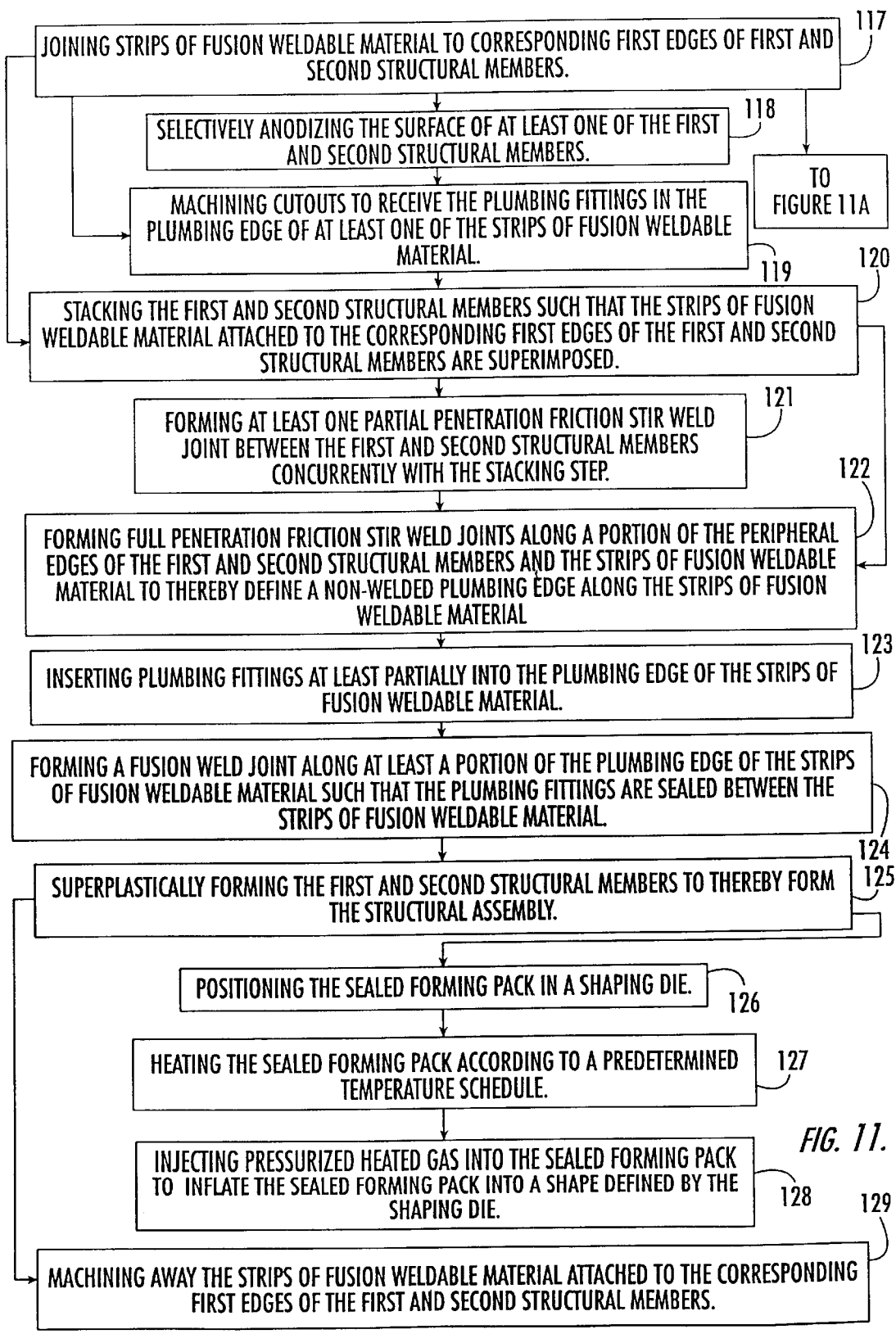
FIG. 11 is a flow chart illustrating the steps for manufacturing a structural assembly, according to still another embodiment of the present invention.
Figure 11A:
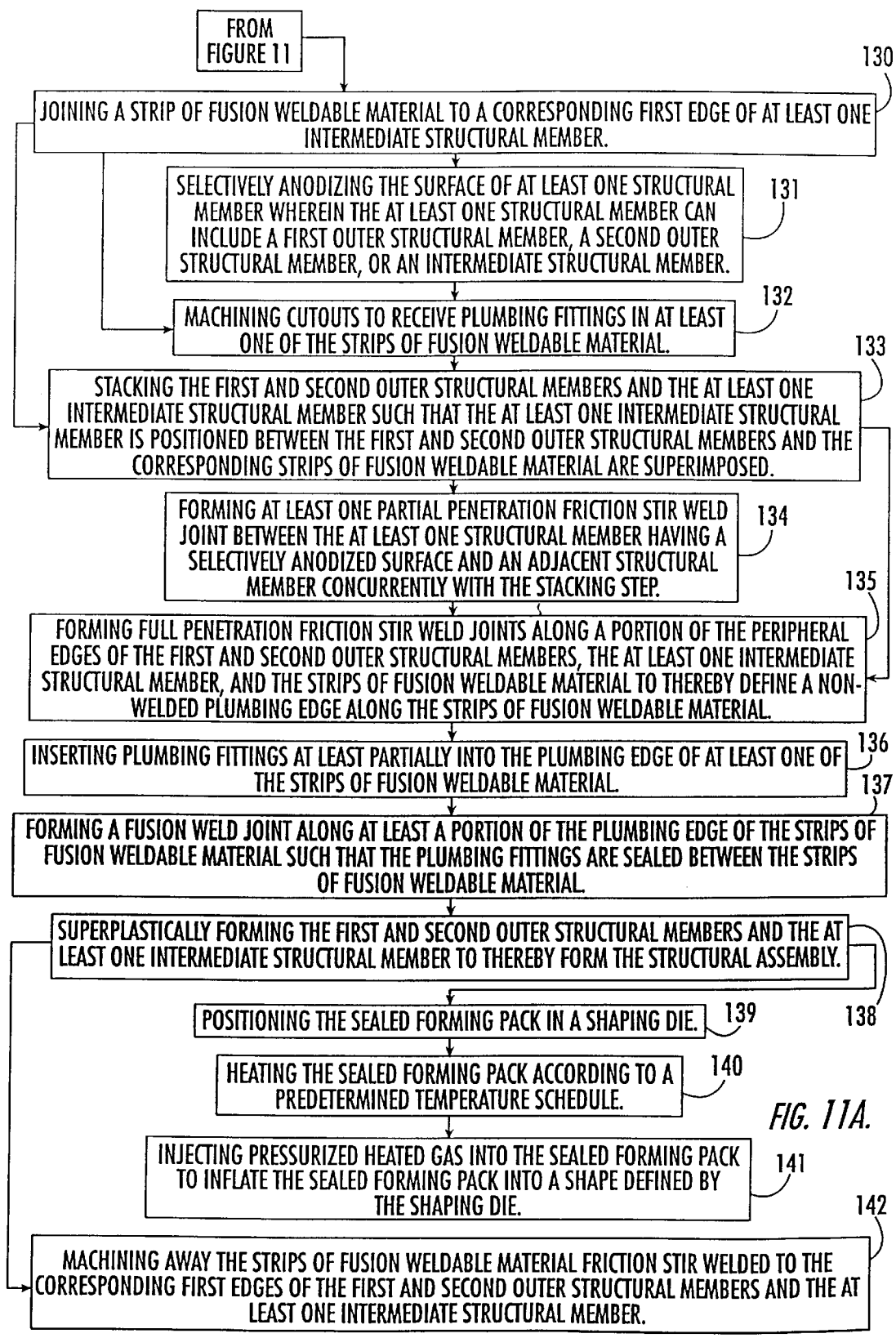
FIG. 11A is a flow chart illustrating the steps for manufacturing a structural assembly, according to still another embodiment of the present invention.

In still another embodiment, as illustrated in FIG. 11A, the method of manufacture may also include joining a strip of fusion weldable material to a corresponding first edge of at least one intermediate structural member. See block 130. According to this embodiment, the first and second outer structural members and the at least one intermediate structural member are stacked such that the at least one intermediate structural member is positioned between the first and second outer structural members and the corresponding strips of fusion weldable material are superimposed. See block 133. After the stacking step, full-penetration friction stir weld joints are formed along a portion of the peripheral edges of the first and second outer structural members, the at least one intermediate structural member, and the strips of fusion weldable material to thereby define a non-welded plumbing edge along the strips of fusion weldable material. See block 135. Plumbing fittings are then at least partially inserted into the plumbing edge of at least one of the strips of fusion weldable material. See block 136. In one embodiment, prior to the stacking step, cutouts can be machined in the plumbing edge of at least one of the strips of fusion weldable material to receive the plumbing fittings. See block 132. After the inserting step, a fusion weld joint is formed along at least a portion of the plumbing edge of the strips of fusion weldable material such that the plumbing fittings are sealed between the strips of fusion weldable material. See block 137. The first and second outer structural members and the at least one intermediate structural member are then superplastically formed to thereby form the structural assembly. See block 138. The strips of fusion weldable material friction stir welded to the corresponding first edges of the first and second outer structural members and the at least one intermediate structural member may be machined away after the superplastic-forming step. See block 142. In one embodiment, the surface of at least one structural member, which structural member may include the first outer structural member, the second outer structural member, or the at least one intermediate structural member, may be selectively anodized prior to the stacking step. See block 131. In another embodiment, at least one partial-penetration friction stir weld joint may be formed between the at least one structural member having a selectively anodized surface and an adjacent structural member prior to the stacking step. See block 134.

Figure 12:
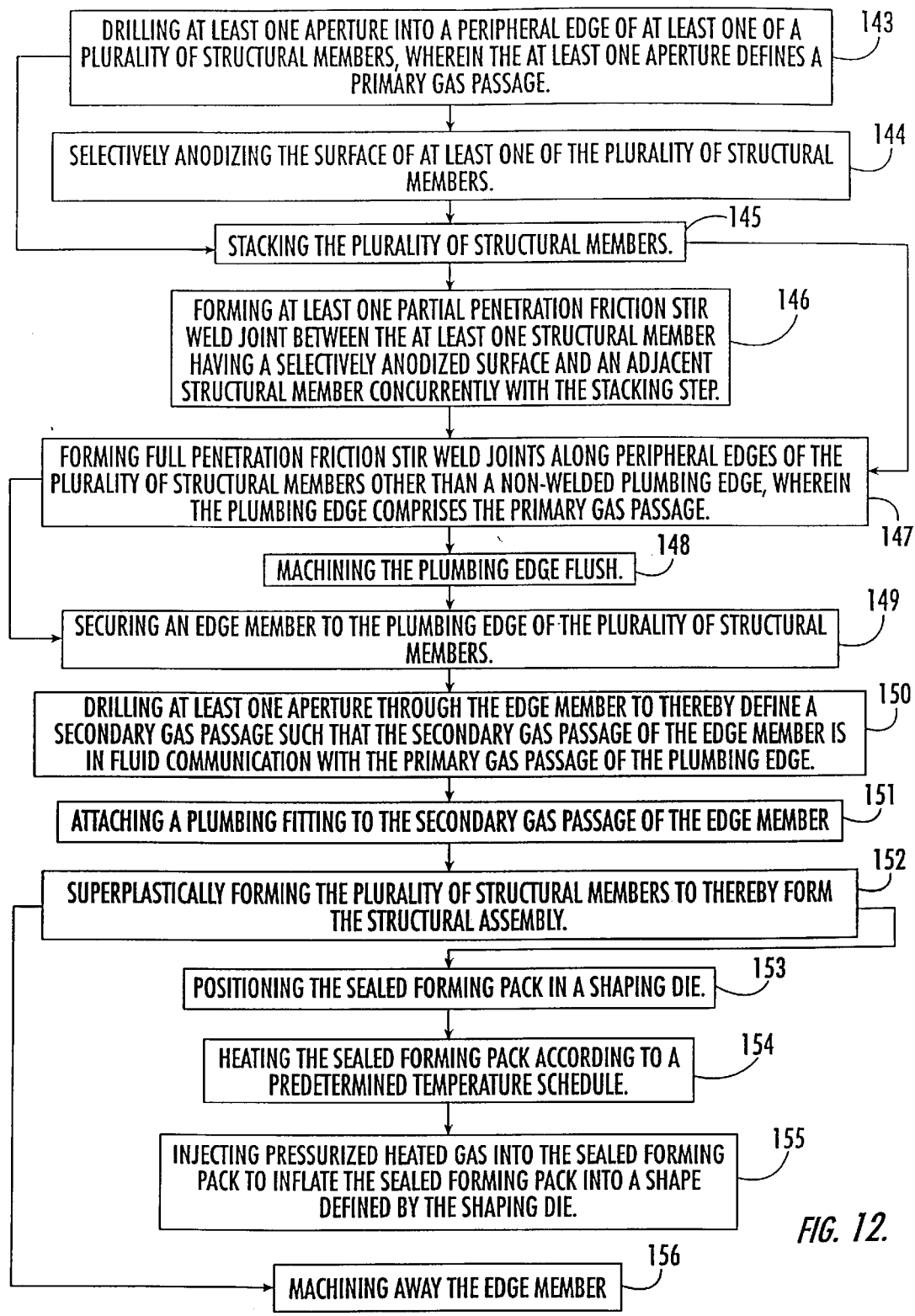
FIG. 12 is a flow chart illustrating the steps for manufacturing a structural assembly, according to still another embodiment of the present invention.

In still another embodiment, as illustrated in FIG. 12, the method of manufacturing a structural assembly includes the steps of drilling at least one aperture into a peripheral edge of at least one of a plurality of structural members, wherein the at least one aperture defines a primary gas passage. See block 143. The plurality of structural members are stacked. See block 145. After the stacking step, forming full-penetration friction stir weld joints along peripheral edges of the plurality of structural members other than a non-welded plumbing edge, wherein the plumbing edge comprises the primary gas passage. See block 147. An edge member is secured to the plumbing edge of the plurality of structural members. See block 149. The plumbing edge may be machined flush prior to the securing step. See block 148. At least one aperture is drilled through the edge member to thereby define a secondary gas passage such that the secondary gas passage of the edge member is in fluid communication with the primary gas passage of the plumbing edge. See block 150. A plumbing fitting is attached to the secondary gas passage of the edge member. See block 151. The plurality of structural members are then superplastically formed to thereby form the structural assembly. See block 152. The edge member may be machined away after the superplastic-forming step. See block 156. In one embodiment, the surface of at least one of the plurality of structural members is selectively anodized prior to the stacking step. See block 144. In another embodiment, at least one partial-penetration friction stir weld joint may be formed between the at least one structural member having a selectively anodized surface and an adjacent structural member prior to the stacking step. See block 146.

Accordingly, there has been provided a structural assembly and an associated method of manufacture allowing for the cost-effective manufacture of superplastically-formed structural assemblies using friction stir welding to form the SPF packs. The method of manufacture minimizes thermo-compression welding of the interface between adjacent structural members and prevents damage to the plumbing fittings of the SPF packs. The resultant structural assemblies have fine details, close tolerances, and minimal residual stresses.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of manufacturing a structural assembly, comprising:
   providing first and second structural members;
   selectively anodizing a surface of at least one of the first and second structural members to thereby prevent thermo-compression welding between the first and second structural members;
   stacking the first and second structural members;
   selectively joining the first and second structural members after said stacking step to form a sealed forming pack; and thereafter, superplastically forming the sealed forming pack to thereby form the structural assembly.

2. A method according to claim 1 wherein said selective anodizing step comprises immersing the at least one of the first and second structural members in an anodize bath as the anode in an electrolytic cell.

3. A method according to claim 1 wherein said selective anodizing step comprises brush anodizing the surface of the at least one of the first and second structural members.

4. A method according to claim 1 further comprising machining the structural assembly after said superplastic-forming step.

5. A method according to claim 1 wherein said superplastic-forming step comprises:
 positioning the sealed forming pack in a shaping die;
 heating the sealed forming pack according to a predetermined temperature schedule; and
 injecting pressurized heated gas into the sealed forming pack following said heating step to inflate the sealed forming pack into a shape defined by the shaping die.

6. A method of manufacturing a structural assembly, comprising:
 selectively anodizing a surface of at least one structural member selected from the group consisting of first and second outer structural members and first and second intermediate structural members to thereby prevent thermo-compression welding to the at least one structural member having the selectively anodized surface;
 stacking the first and second outer structural members and the at least one intermediate structural member such that the at least one intermediate structural member is positioned between the first and second outer structural members;
 selectively joining the first and second outer structural members to the at least one intermediate structural member to form a sealed forming pack; and
 superplastically forming the sealed forming pack to thereby form a structural assembly.

7. A method according to claim 6 wherein said selective anodizing step comprises immersing the at least one structural member in an anodize bath as the anode in an electrolytic cell.

8. A method according to claim 6 wherein said selective anodizing step comprises brush anodizing the surface of the at least one structural member.

9. A method according to claim 6 further comprising machining the structural assembly after said superplastic-forming step.

10. A method according to claim 6 wherein said selective joining step occurs concurrently with said stacking step.

11. A method according to claim 6 wherein said super-plastic forming step comprises:
 positioning the sealed forming pack in a shaping die;
 heating the sealed forming pack according to a predetermined temperature schedule; and
 injecting pressurized heated gas into the sealed forming pack following said heating step to inflate the sealed forming pack into a shape defined by the shaping die.

12. A method of manufacturing a structural assembly, comprising:
 joining strips of fusion weldable material to corresponding first edges of first and second structural members;
 stacking the first and second structural members such that the strips of fusion weldable material attached to the corresponding first edges of the first and second structural members are superimposed;
 after said stacking step, forming full-penetration friction stir weld joints along a portion of the peripheral edges of the first and second structural members and the strips of fusion weldable material to thereby define a non-welded plumbing edge along the strips of fusion weldable material;
 inserting plumbing fittings at least partially into the plumbing edge of the strips of fusion weldable material;
 after said inserting step, forming a fusion weld joint along at least a portion of the plumbing edge of the strips of fusion weldable material such that the plumbing fittings are sealed between the strips of fusion weldable material; and
 superplastically forming the first and second structural members to thereby form the structural assembly.

13. A method according to claim 12 further comprising forming at least one partial-penetration friction stir weld joint between the first and second structural members after said stacking step.

14. A method according to claim 13 further comprising selectively anodizing the surface of at least one of the first and second structural members prior to said partial-penetration-weld-joint-forming step.

15. A method according to claim 13 wherein said selective anodizing step comprises immersing the at least one of the first and second structural members in an anodize bath as the anode in an electrolytic cell.

16. A method according to claim 13 wherein said selective anodizing step comprises brush anodizing the surface of the at least one of the first and second structural members.

17. A method according to claim 12 further comprising machining cutouts to receive the plumbing fittings in the plumbing edge of at least one of the strips of fusion weldable material prior to said stacking step.

18. A method according to claim 12 further comprising machining away the strips of fusion weldable material attached to the corresponding first edges of the first and second structural members after said superplastic-forming step.

19. A method according to claim 12 wherein said superplastic-forming step comprises:
 positioning the sealed forming pack in a shaping die;
 heating the sealed forming pack according to a predetermined temperature schedule; and
 injecting pressurized heated gas into the sealed forming pack following said heating step to inflate the sealed forming pack into a shape defined by the shaping die.

20. A method according to claim 12 further comprising:
 joining a strip of fusion weldable material to a corresponding first edge of at least one intermediate structural member;
 stacking the first and second outer structural members and the at least one intermediate structural member such that the at least one intermediate structural member is positioned between the first and second outer structural members and the corresponding strips of fusion weldable material are superimposed;
 after said stacking step, forming full-penetration friction stir weld joints along a portion of the peripheral edges of the first and second outer structural members, the at least one intermediate structural member, and the strips of fusion weldable material to thereby define a non-welded plumbing edge along the strips of fusion weldable material;
 inserting plumbing fittings at least partially into the plumbing edge of at least one of the strips of fusion weldable material;

after said inserting step, forming a fusion weld joint along at least a portion of the plumbing edge of the strips of fusion weldable material such that the plumbing fittings are sealed between the strips of fusion weldable material; and superplastically forming the first and second outer structural members and the at least one intermediate structural member to thereby form the structural assembly.

21. A method according to claim 20 further comprising selectively anodizing the surface of at least one structural member selected from the group consisting of the first and second outer structural members and the first and second intermediate structural members prior to said stacking step.

22. A method according to claim 21 wherein said selective anodizing step comprises immersing the at least one structural member in an anodize bath as the anode in an electrolytic cell.

23. A method according to claim 21 wherein said selective anodizing step comprises brush anodizing the surface of the at least one structural member.

24. A method according to claim 21 further comprising forming at least one partial-penetration friction stir weld joint between the at least one structural member having a selectively anodized surface and an adjacent structural member concurrently with said stacking step.

25. A method according to claim 20 further comprising machining cutouts to receive the plumbing fittings in the plumbing edge of at least one of the strips of fusion weldable material prior to said stacking step.

26. A method according to claim 20 further comprising machining away the strips of fusion weldable material friction stir welded to the corresponding first edges of the first and second outer structural members and the at least one intermediate structural member after said superplastic-forming step.

27. A method according to claim 20 wherein said superplastic-forming step comprises:

positioning the sealed forming pack in a shaping die;

heating the sealed forming pack according to a predetermined temperature schedule; and injecting pressurized heated gas into the sealed forming pack following said heating step to inflate the sealed forming pack into a shape defined by the shaping die.

28. A method of manufacturing a structural assembly, comprising:

drilling at least one aperture into a peripheral edge of at least one of a plurality of structural members, wherein the at least one aperture defines a primary gas passage;

stacking the plurality of structural members;

after said stacking step, forming full penetration friction stir weld joints along peripheral edges of the plurality of structural members other than a non-welded plumbing edge, wherein the plumbing edge comprises the primary gas passage;

securing an edge member to the plumbing edge of the plurality of structural members;

drilling at least one aperture through the edge member to thereby define a secondary gas passage such that the secondary gas passage of the edge member is in fluid communication with the primary gas passage of the plumbing edge;

attaching a plumbing fitting to the secondary gas passage of the edge member; and superplastically forming the plurality of structural members to thereby form the structural assembly.

29. A method according to claim 28 further comprising machining the plumbing edge flush prior to said securing step.

30. A method according to claim 28 further comprising selectively anodizing the surface of at least one of the plurality of structural members prior to said stacking step.

31. A method according to claim 30 wherein said selective anodizing step comprises immersing the at least one of the plurality of structural members in an anodize bath as the anode in an electrolytic cell.

32. A method according to claim 30 wherein said selective anodizing step comprises brush anodizing the surface of the at least one of the plurality of structural members.

33. A method according to claim 30 further comprising forming at least one partial-penetration friction stir weld joint between the at least one structural member having a selectively anodized surface and an adjacent structural member after said selective anodizing step.

34. A method according to claim 28 further comprising machining away the edge member after said superplastic-forming step.

35. A method according to claim 28 wherein said superplastic-forming step comprises:

positioning the sealed forming pack in a shaping die;

heating the sealed forming pack according to a predetermined temperature schedule; and injecting pressurized heated gas into the sealed forming pack following said heating step to inflate the sealed forming pack into a shape defined by the shaping die.

* * * * *